(12) United States Patent
Narayanan et al.

(10) Patent No.: US 8,209,202 B2
(45) Date of Patent: Jun. 26, 2012

(54) ANALYSIS OF MULTIPLE ASSETS IN VIEW OF UNCERTAINTIES

(75) Inventors: Keshav Narayanan, Houston, TX (US); David E. Heath, Highlands Ranch, CO (US); Alvin Stanley Cullick, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 672 days.

(21) Appl. No.: 11/415,394

(22) Filed: May 1, 2006

(65) Prior Publication Data
US 2008/0120148 A1 May 22, 2008

Related U.S. Application Data

(63) Continuation-in-part of application No. 11/215,737, filed on Aug. 30, 2005.

(60) Provisional application No. 60/676,484, filed on Apr. 29, 2005.

(51) Int. Cl.
*G06Q 10/04* (2012.01)
*G06F 9/455* (2006.01)

(52) U.S. Cl. ............... 705/7.11; 705/7.28; 703/2; 703/9; 703/10

(58) Field of Classification Search .................. 705/7.11, 705/7.28; 703/2, 9, 10
See application file for complete search history.

(56) References Cited

U.S. PATENT DOCUMENTS

| | | | |
|---|---|---|---|
| 5,103,920 A | 4/1992 | Patton | |
| 5,980,096 A | 11/1999 | Thalhammer-Reyero | |
| 6,236,894 B1 * | 5/2001 | Stoisits et al. | 700/28 |
| 6,253,113 B1 * | 6/2001 | Lu | 700/28 |
| 6,266,619 B1 | 7/2001 | Thomas et al. | |
| 6,356,844 B2 | 3/2002 | Thomas et al. | |
| 6,549,854 B1 * | 4/2003 | Malinverno et al. | 702/16 |
| 6,612,382 B2 | 9/2003 | King | |
| 6,715,551 B2 | 4/2004 | Curtis et al. | |

(Continued)

FOREIGN PATENT DOCUMENTS
WO    WO 0048022    8/2000

(Continued)

OTHER PUBLICATIONS

Cullick, S., et al., "Optimizing Multiple-Field Scheduling and Production Strategy with Reduced Risk," paper SPE 8899 (Nov. 2004), Society of Petroleum Engineers: Distinguished Author Series, pp. 77-83.*

(Continued)

*Primary Examiner* — Beth V Boswell
*Assistant Examiner* — Tiphany B. Dickerson
(74) *Attorney, Agent, or Firm* — Meyertons Hood Kivlin Kowert & Goetzel, P.C.; Jeffrey C. Hood; Mark K. Brightwell

(57) ABSTRACT

A client-server based system for building and executing flows (i.e., interconnected systems of algorithms). The client allows a user to build a flow specification and send the flow specification to the server. The server assembles the flow from the flow spec and executes the flow. A flow may be configured to analyze the impact (e.g., the financial impact) of a number of uncertainties associated with a plurality of assets. Uncertainty variables are used to characterize the uncertainties associated with the assets. An uncertainty variable associated with one asset may be functionally dependent on an uncertainty variable associated with another asset.

20 Claims, 13 Drawing Sheets

U.S. PATENT DOCUMENTS

| | | | |
|---|---|---|---|
| 6,735,596 B2* | 5/2004 | Corynen | 707/102 |
| 6,810,332 B2* | 10/2004 | Harrison | 702/13 |
| 6,853,921 B2 | 2/2005 | Thomas et al. | |
| 6,980,940 B1 | 12/2005 | Gurpinar et al. | |
| 6,988,076 B2* | 1/2006 | Ouimet | 705/7.36 |
| 7,004,251 B2 | 2/2006 | Ward et al. | |
| 7,010,558 B2 | 3/2006 | Morris | |
| 7,047,171 B1 | 5/2006 | Sproch | |
| 7,066,257 B2 | 6/2006 | Wellington et al. | |
| 7,096,172 B2 | 8/2006 | Colvin et al. | |
| 7,130,761 B2* | 10/2006 | Hall et al. | 702/181 |
| 7,165,615 B2 | 1/2007 | Vinegar et al. | |
| 7,181,380 B2 | 2/2007 | Dusterhoft et al. | |
| 7,219,032 B2 | 5/2007 | Spiesberger | |
| 7,277,836 B2 | 10/2007 | Netemeyer et al. | |
| 7,349,838 B2* | 3/2008 | Summers | 703/22 |
| 7,379,890 B2* | 5/2008 | Myr et al. | 705/10 |
| 7,389,209 B2* | 6/2008 | Masiello et al. | 703/2 |
| 7,451,066 B2 | 11/2008 | Edwards et al. | |
| 7,467,045 B2* | 12/2008 | Tabanou et al. | 702/13 |
| 7,474,995 B2* | 1/2009 | Masiello et al. | 703/2 |
| 7,478,024 B2 | 1/2009 | Gurpinar et al. | |
| 7,546,228 B2* | 6/2009 | Cullick et al. | 703/10 |
| 7,835,893 B2* | 11/2010 | Cullick et al. | 703/6 |
| 2002/0013687 A1 | 1/2002 | Ortoleva | |
| 2002/0100584 A1* | 8/2002 | Couet et al. | 166/250.15 |
| 2002/0120429 A1 | 8/2002 | Ortoleva | |
| 2003/0149571 A1* | 8/2003 | Francesco et al. | 705/1 |
| 2003/0204434 A1* | 10/2003 | Linton et al. | 705/10 |
| 2003/0225606 A1* | 12/2003 | Raghuraman et al. | 705/7 |
| 2004/0039622 A1* | 2/2004 | Masiello et al. | 705/8 |
| 2004/0174357 A1 | 9/2004 | Cheung et al. | |
| 2004/0181422 A1 | 9/2004 | Brand | |
| 2004/0220790 A1* | 11/2004 | Cullick et al. | 703/10 |
| 2004/0220846 A1* | 11/2004 | Cullick et al. | 705/8 |
| 2004/0236709 A1* | 11/2004 | Johnson et al. | 706/21 |
| 2005/0004833 A1* | 1/2005 | McRae et al. | 705/11 |
| 2006/0271210 A1* | 11/2006 | Subbu et al. | 700/44 |

FOREIGN PATENT DOCUMENTS

| | | |
|---|---|---|
| WO | WO 0162603 | 8/2001 |

OTHER PUBLICATIONS

Jonsbraten, T.W., "Oil Field Optimization under Price Uncertainty," (Aug. 1998) The Journal of the Operational Research Society, vol. 49, No. 8, pp. 811-818.*

Kulhavy, R., "A Developer's Perspective of a Decision Support System," (Dec. 2003), IEEE Control System Magazine, pp. 40-49.*

Mattson, C.A. and Messac, A., "Pareto Frontier Based Concept Selection Under Uncertainty with Visualization," (2003), Optimization and Engineering, Special Issue on Multidisciplinary Design Optimiztion, in Press.*

OptQuest:Finding the Best Solutions Under Uncertain Conditions, accessed at: http://web.archive.org/web/20030605093613/www.crystalball.com/spotlight/printer_friendly/spotlight14_print.html.*

Queipo, N.V., et al., A Model of the Integrated Optimization of Oil Production Systems (2003) Engineering with Computers: vol. 19, pp. 130-141.*

Solis, R. et al., "Optimum Offshore Gas Asset Development Planning with Simulataneous Subsurface and Surface Modeling and Simulation" (Oct. 24-27, 2004), AAPG International Conference, Cancun, Mexico, (6 pages).*

Wood, D.A., "Portfolio Optimization Benefits from Integrating Analysis of Risk, Strategy, and Valuation," Oil & Gas Journal. Tulsa: Jul. 8, 2002. vol. 100, Iss. 27; p. 26-30.*

Floris, F.J.T. and Peersmann, M.R.H.E.:"Integrated scenario and probabilistic analysis for asset decision support", Petroleum Geoscience, 8(1), (2002), pp. 1-6.

"TERAS Evaluation Module User Guide"; Landmark Corp.; 2000, pp. 1-215.

Owen, Art B.; "Controlling Correlations in Latin Hypercube Samples"; Journal of the American Statistical Association, Dec. 1994, vol. 89, No. 428, pp. 1517-1522.

Stein, Michael; "Large Sample Properties of Simulation Using Latin Hypercube Sampling"; Technometrics, May 1987, vol. 29, No. 2; pp. 143-151.

Pallister, I & D. Pointing: "Asset Optimization Using Multiple Realizations and Streamline Simulations" Apr. 25, 2000, SPE 59460, XP-002261290; 11 pages.

Fassihi, et al. "Risk Management for the Development of an Onshore Prospect" Mar. 20, 1999, SPE 52975, XP-002261289; 6 pages.

Reynolds, W.W.; "Economic Analysis of Drilling Plans and Contractors by Use of a Drilling Systems Approach"; Journal of Petroleum Technology, Jul. 1986, XP-002261288; pp. 787-793.

International Search Report and Written Opinion, International Appln. No. PCT/US2004/013371, mailed Sep. 22, 2004; 12 pages.

U.S. Appl. No. 60/183,836, entitled "Method for monitoring and controlling drainage of a petroleum reservoir", by Vidya Verma, filed on Feb. 22, 2000.

Sameer Joshi, William E. Brigham, Louis Castanier; "Techno-Economic and Risk Evaluation of a Thermal Recovery Project"; Work Performed Under Contract DE-FG22-93BC14899, Mar. 1996, 88 pages.

Yarus, J.M., K. Yang, and K. Kramer; "Practical Workflows for Reservoir Modelling"; Geostatistics Rio 2000: Proceedings of the Geostatistics Sessions of the 31st International Geological Congress, Rio de Janeiro, Brazil, Aug. 6-17, 2000, pp. 69-84.

Herweijer, Joost C., Jeffrey Yarus, Jack Breig, Michael J.V. Suana, and Richard Chambers; "Process Based Knowledge Management—Overview and Application to 3D Modelling Workflows"; Presented at AAPG International Conference: Oct. 24-27, 2004, Cancun, Mexico; 6 pages.

Herweijer, J.C., J.M. Yarus, and M.J.V. Suana; "Process-based Knowledge Management: Overview and Application of Iterative 3-D Modeling Workflows—Chapter 24"; 2006; 12 pages.

Begg, et al., "Improving Investment Decisions Using a Stochastic Integrated Asset Model", Society of Petroleum Engineers, Inc., 2001 SPE Annual Technical Conference and Exhibition, New Orleans, Louisiana, Sep. 30-Oct. 3, 2001, 16 pages.

Williams, et al., "Top-Down Reservoir Modeling", Society of Petroleum Engineers, Inc., SPE Annual Technical Conference and Exhibition, Houston, Texas, Sep. 26-29, 2004, 8 pages.

Narayanan, et al., "Better Field Development Decisions from Multiscenario, Interdependent Reservoir, Well, and Facility Simulations", Society of Petroleum Engineers, Inc., SPE Reservoir Simulation Symposium, Houston, Texas, Feb. 3-5, 2003, 11 pages.

Cullick, et al, "Optimizing Multiple-Field Scheduling and Production Strategy with Reduced Risk", Society of Petroleum Engineers, Distinguished Author Series, Nov. 2004, pp. 77-83.

Hegstad, et al, "Rapid Scenario and Risk Analysis for a Complex Gas Field with Large Uncertainties", Society of Petroleum Engineers, SPE Annual Technical Conference and Exhibition, Houston, Texas, Sep. 26-29, 2004, 11 pages.

Solis, et al, "Risk, Uncertainty and Optimization for Offshore Gas Asset Planning in Litoral Tabasco", Society of Petroleum Engineers, SPE Annual Technical Conference and Exhibition, Houston, Texas, Sep. 26-29, 2004, 10 pages.

Keshav Narayanan, et al., "Optimization of decisions regarding multiple assets in the presence of various underlying uncertainties," U.S. Appl. No. 11/215,737, filed Aug. 30, 2005, 84 pages.

* cited by examiner

ANALYSIS OF MULTIPLE ASSETS IN VIEW OF UNCERTAINTIES

This application claims the benefit of priority to U.S. Provisional Application No. 60/676,484, filed on Apr. 29, 2005, entitled "Extensible Decision Management System", invented by David Heath, which is hereby incorporated by reference in its entirety.

This application is a continuation-in-part of U.S. application Ser. No. 11/215,737, filed on Aug. 30, 2005, entitled "Optimization of Decisions Regarding Multiple Assets in the Presence of Various Underlying Uncertainties", invented by Keshav Narayanan, David Heath and Alvin Stanley Cullick, which claims priority to U.S. Provisional Application No. 60/676,484, filed on Apr. 29, 2005.

U.S. application Ser. No. 11/215,737 filed on Aug. 30, 2005 is hereby incorporated by reference in its entirety.

BACKGROUND OF THE INVENTION

1. Field of the Invention

This invention relates generally to the field of decision, uncertainty, and optimization analysis, and more particularly, to a system and method for optimizing decisions regarding a system of assets in the presence of uncertainty.

2. Description of the Related Art

There are a wide array of activities that are typically performed in the process of exploring, developing and operating oil and gas fields (assets), e.g., activities such as:
- leasing land;
- acquiring seismic data;
- drilling exploratory wells;
- drilling production wells;
- completing the wells;
- building facilities to process and store the production from wells.

While these activities require large expenditures of capital, these expenditures are viewed as investments in the hope of gaining revenues (e.g., from the sale of oil and gas) that significantly exceed the total amount of the expenditures. Thus, these activities may be referred to herein as investment activities.

Each of the investment activities requires one to make various decisions, e.g., decisions regarding:
- how much land to lease, and, which parcels of land to lease;
- how to acquire the seismic data, and, how much seismic data to acquire;
- how many exploratory wells to drill, and, where to drill to the exploratory wells;
- how to develop fields;
- how many production and injection wells to drill, where to drill the wells, and, what the well plan (i.e., the trajectory through space for the well bore) should be for each of the production wells;
- how many perforations to make for each well, and, how to distribute perforation locations along the well plan for each well;
- which order to drill and perforate wells;
- what size to construct processing facilities and how to connect the wells to the facilities and to exporting systems;
- how to process the fluids produced from the geologic formation;
- in the cases with a plurality of potential productive assets, which assets and which order to develop and produce the assets.

Furthermore, these decisions must be made in the context of a whole host of fundamental uncertainties, e.g., uncertainties in factors such as:
- the future prices of oil and gas leases;
- the amount of oil and/or gas reserves in a field;
- the shape and physical properties of reservoirs in each field;
- the amount of time it will take to drill each exploratory well and each production well;
- the future availability of equipment such as drilling rigs and completion rigs;
- the costs associated with operating and maintaining production and injection from the wells and facilities;
- the future prices of oil and gas;
- the stability of weather conditions.

Any way one makes a decision, these fundamental uncertainties imply uncertainties in rewards such as production volume, revenue and profit. Therefore, there exists a need for systems and methods capable of assisting one in making decisions (each decision having a range of available options) regarding oil and gas field exploitation in view of fundamental uncertainties.

SUMMARY

In one set of embodiments, a method for analyzing the impact of uncertainties associated with a set of assets may involve:

(a) receiving information specifying a set of uncertainty variables for a plurality of assets and specifying a functional relationship between a first and a second of the uncertainty variables, where the first uncertainty variable is associated with a first of the assets, where the second uncertainty variable is associated with a second of the assets;

(b) generating values for each of the uncertainty variables, where the process of generating the values includes generating a value for the first uncertainty variable, and computing a value for the second uncertainty variable from the value of the first uncertainty variable based on the functional relationship;

(c) determining for each of the assets a corresponding input data set using at least a corresponding subset of the uncertainty variable values;

(d) for each of the assets, invoking execution of a corresponding set of one or more algorithms, where each set of one or more algorithms operates on the corresponding input data set to generate a corresponding output data set;

(e) performing (b), (c) and (d) a plurality of times to generate a plurality of output data sets for each asset;

(f) computing one or more statistics for each of the assets based on the corresponding plurality of output data sets;

(g) generating resultant data based at least partially on the statistics of the assets;

(h) displaying an indication of the resultant data on a display device.

The process (c) of determining the input data sets for the assets may include:
- determining a first input data set corresponding to the first asset using at least the value of the first uncertainty variable; and
- determining a second input data set corresponding to the second asset using at least the value of the second uncertainty variable.

The assets may be assets related to the exploration and production of one or more of oil and gas. For example, the assets may include a set of oil and gas fields.

The set of one or more algorithms for each asset may be selected by a user. The algorithms may be selected from a wide variety of supported algorithms.

In one embodiment, the process (d) may include:
distributing the input data sets of the assets to one or more remote computers for remote execution of the corresponding sets of algorithms; and
receiving the output data sets from the one or more remote computers.

The information received in (a) may also specify one or more correlations among the uncertainty variables. The process (b) of generating values for each of the uncertainty variables respects the one or more specified correlations. The correlations may include correlations between uncertainty variables across different assets.

In some embodiments, the process (c) may include selecting one of two or more models for incorporation into one of the input data sets based on the value of a third of the uncertainty variables.

In one embodiment, the process (c) may include:
selecting one of two or more models based on the value of a third of the uncertainty variables; and
selecting one of two or more submodels of the selected model based on the value of a fourth of the uncertainty variables.

The selected submodel is usable to determine data to be incorporated into one (or more) of the input data sets.

More generally, a hierarchical tree of models having any desired number of levels may be configured by the user. A data structure may be composed by:
traversing the tree from top to bottom based on the values of one or more of the uncertainty variables and
appending the data included in each node along the traversed path.

At each stage of the traversal, a corresponding uncertainty variable value controls which child node is to be selected.

In some embodiments, the method may further involve:
(1) receiving information specifying a plurality of decision variables;
(2) generating values for the decision variables, where the decision variable values are used to determine the input data sets for the assets;
(3) computing a value of a global objective from the one or more statistics of each of the assets; and
executing an optimizer in order to determine one or more sets of values for the decision variables.

The process of executing an optimizer may include performing at least (2), (e), (f) and (3) a number of times, wherein the optimizer is configured to search for a maximum or minimum of the global objective over at least a portion of a space defined by the decision variables.

The optimizer may be selectable by a user from a set of supported optimizers.

The process (h) of displaying an indication of the resultant data may include displaying a graphical representation of at least a subset of the one or more sets of values for the decision variables.

The information received in (1) may also specify one or more constraints on the decision variables. In this case, the generation of values for the decision variables respects the one or more constraints.

The information received in (1) may also specify one or more functional dependencies between the decision variables. In this case, the generation of values for the decision variables respects the one or more functional dependencies between the decision variables.

Each of the decision variables has an associated set of attainable values representing possible outcomes of a corresponding decision. Furthermore, each of the uncertainty variables has an associated set of attainable values. Attainable value sets may be finite sets or sets having infinite cardinality.

In one of the "optimizer" embodiments, the method may further include:
(4) computing a value of an auxiliary function from the one or more statistics of each of the assets.

In this case, the process of executing the optimizer may include performing (2), (e), (f), (3) and (4) a number of times. The optimizer may be configured to search for the maximum or minimum of the global objective subject at least to a constraint on a functional combination of the global objective and the auxiliary function. The functional combination may be user specified.

The process (h) of displaying an indication of the resultant data on a display device may include displaying a plot of the global objective value versus auxiliary function value.

In another set of embodiments, a method for optimizing decisions related to oil and gas field exploration, development and production may involve:
(a) receiving user input specifying two or more algorithms and specifying one or more connections between the two or more algorithms, where each of the connections is a connection between an output of one of the algorithms and the input of another of the algorithms;
(b) receiving user input specifying one or more data structures consistent with the two or more algorithms;
(c) operating on the one or more data structures in response to user input in order to build one or more models for the two or more algorithms, where the one or more models include one or more uncertainty variables and one or more decision variables;
(d) receiving user input specifying one or more statistics to be computed on output of the two or more algorithms;
(e) receiving user input specifying a functional combination of the statistics in order to define a global objective;
(f) receiving user input specifying an optimizer;
(g) performing an optimization using the user-specified optimizer in order to seek an optimum of the global objective, where said performing the optimization includes:
(g1) generating one or more values of the one or more decision variables respectively;
(g2) invoking a plurality of executions of the two or more algorithms according to the one or more connections, where each of the executions operates on a corresponding set of one or more instantiated models determined by the one or more models, the one or more decision variable values and a corresponding set of one or more instantiated values of the one or more uncertainty variables;
(g3) computing the statistics based on the output from the plurality of executions;
(g4) computing a value of the global objective from the statistics;
(g5) repeating (g1) through (g4) a number of times.

In some embodiments, the processes (a)-(e) may be performed on a client computer and process (g) may be performed on a server computer. Thus, the method may also involve sending information specifying the two or more algorithms, information specifying the one or more connections, information specifying the one or more statistics, information specifying the optimizer and information specifying the global objective to the server computer.

In some embodiments, the server computer may perform (g2) by:
- (g2.1) generating a set of one or more instantiated values of the one or more uncertainty variables;
- (g2.2) determining one or more instantiated models from the one or more models and the set of one or more instantiated values;
- (g2.3) sending the one or more instantiated models to a remote computer, where the remote computer performs one of the plurality of executions of the two or more algorithms on the one or more instantiated models; and
- repeating (g2.1) through (g2.3) in order to distribute the plurality of executions to a set of one or more remote computers.

In one embodiment, the method may further involve receiving user input specifying a dispatcher. The dispatcher is a program that controls the process of invoking the plurality of executions of the two or more algorithms on the set of remote computers. The server may execute the dispatcher to implement said repeating of (g2.1) through (g2.3).

Furthermore, the method may involve:
- receiving user input specifying one or more auxiliary functions, each auxiliary function being a corresponding functional combination of a corresponding subset of the statistics; and
- receiving user input specifying one or more constraints on the one or more auxiliary functions and the global objective;

The process of performing the optimization respects the one or more constraints on the one or more auxiliary functions and the global objective.

Any or all of the method embodiments (or portions thereof) described herein may be implemented in terms of program instructions. The program instructions may be stored on any of various kinds of computer readable memory media such as magnetic disk, magnetic tape, semiconductor memory of various kinds, bubble memory, CD-ROM, etc.

The program instructions may be stored in the memory of a computer system (or the memories of a set of computer systems). A processor of the computer system may be configured to read and execute the program instructions from the memory, and thereby, implement the method embodiment(s) or portion(s) thereof.

The program instructions (or subsets of the program instructions) may also be transmitted through any of various transmission media, e.g., a computer network.

U.S. patent application Ser. No. 10/653,829, filed on Sep. 3, 2003, entitled "Method and System for Scenario and Case Decision Management", invented by Cullick, Narayanan and Wilson, is hereby incorporated by reference in its entirety.

BRIEF DESCRIPTION OF THE DRAWINGS

A better understanding of the present invention can be obtained when the detailed description presented herein is considered in conjunction with the following drawings.

Figure 1:
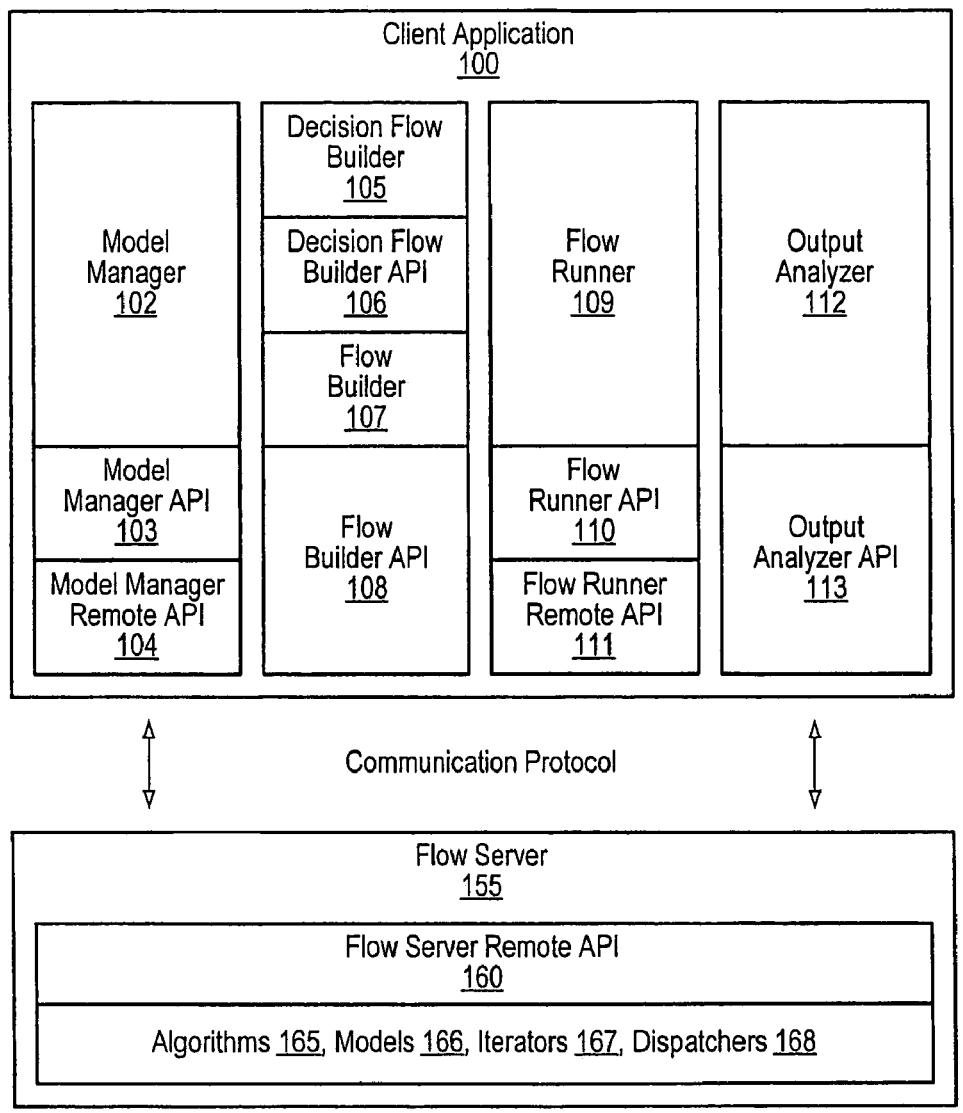
FIG. 1 illustrates one set of embodiments of modules in a client application and a flow server.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In one set of embodiments, a decision management system may be configured to provide mechanisms (e.g., graphical user interfaces) for a user to:
- (a) build an arbitrary flow;
- (b) build a set of models including characterizations of a number of uncertainties and a number of decisions;
- (c) specify an execution control data set including information to qualify and control the execution of a flow;
- (d) invoke the execution of a flow with respect to the set of models and the execution control data set; and
- (e) analyze the results of the flow execution.

A flow is an interconnected set of algorithms for solving a problem. The decision management system may provide a graphical user interface that allows the user to select, import or build algorithms, and, connect the algorithms together to form a flow.

A flow may be configured to include one or more computation loops. The loops may be nested. The loops of a flow may serve any of various purposes. For example, a flow may include a loop in order to perform an optimization on the space corresponding to a number of variables. Variables that are subject to optimization are referred to herein as decision variables. As another example, a flow may include a loop in order to explore the impact of variation in a space corresponding to a number of variables that represent uncertainties. Variables that represent uncertainties are referred to herein as uncertainty variables.

A loop may include an iterator, an algorithm (or, more generally, a collection of algorithms), and optionally, a dispatcher. When a flow is executed, the iterator is responsible for generating iteration data sets for respective executions of the algorithm. Each execution of the algorithm is performed on a corresponding one of the iteration data sets. Each iteration data set contains data used as input by the algorithm. Each execution of the algorithm is referred to herein as an "iteration". However, the term "iteration" is not meant to require sequential processing of one iteration after another. Indeed, the iterator and dispatcher may be configured to arrange for parallel iterations. For example, the iterator may be configured to generate a number of iteration data sets in anticipation of a corresponding number of iterations. The dispatcher may locate other computers (or processors) that have available computational bandwidth, and, distribute the iteration data sets to the other computers so that the iterations may be performed in parallel, or at least partially in parallel depending on the number of available computers.

In one embodiment, the dispatcher may compress one or more of the iteration data sets to form an execution file and transfer the execution file to one of the remote computers (having available computational bandwidth). The remote computer may decompress the execution file to recover the iteration data sets, and, execute the algorithm once for each of the iteration data sets. The algorithm may include code that sends the results of each execution back to the first computer (i.e., the computer that the dispatcher is executing on) for storage.

As noted above, the execution file may include compressed iteration data sets. If a remote computer does not already have a copy of the executable code for the algorithm, the dispatcher may compress a copy of the executable code and include the compressed code in the execution file.

As indicated above, a flow is an interconnected set of algorithms for solving a problem. The algorithms operate on data structures. Different types of algorithms operate on different types of data structures. For example, a reservoir flow simulator, configured to predict rates of production of oil, gas and water, operates on a different set of data structures than an economic algorithm configured to predict economic returns. The decision management system may provide an interface through which the user may specify the source locations (e.g., the file system locations on a network) of files and/or databases containing the data structures. Furthermore, the decision management system may invoke tools that allow the user to create and modify data structures.

Each data structure includes a set of one or more data values. However, some of the data values of a data structure may represent parameters or quantities that are uncertain. Thus, the decision management system may provide a mechanism for the user to select a data value in a data structure and to promote the data value to an uncertainty variable by supplying a set of attainable values for the uncertainty variable and a probability distribution for the uncertainty variable. (The original data value may be included by default as one of the values in the attainable value set of the uncertainty variable.) Any number of data values in any number of data structures may be thusly promoted to uncertainty variables.

Furthermore, a data value in a data structure may represent one possible outcome of a decision. The user may wish to consider other possible outcomes of the decision. Thus, the decision management system may provide a mechanism for the user to select a data value in a data structure and to promote the data value to a decision variable by supplying a set of attainable values representing possible outcomes of the decision. (For example, the number of wells to be drilled in a given field may equal any integer from A to B inclusive. As another example, the capacity of a given pump may equal any value in the range from X to Y cubic feet per minute.) The original data value may be included by default as one of the elements of the attainable value set. Any number of data values in any number of data structures may be thusly promoted to decision variables.

The set of attainable values for a decision variable or an uncertainty variable may be a finite set (e.g., a finite set of user-specified numeric values), or, an infinite set (e.g., an interval of the real line or a region in an n-dimensional Euclidean space, where n is a positive integer).

The user may specify the probability distribution for an uncertainty variable by various means. If the uncertainty variable has an attainable value set that is continuous, the decision management system may allow the user to specify a probability density function (PDF) by selecting a PDF type (such as normal, uniform, triangular, etc.) and to specify parameters defining a particular PDF within the selected type. If the uncertainty variable has an attainable value set that is finite, the decision management system may allow the user to enter probability values (or numeric values that may be subsequently normalized to probability values) for the attainable values of the uncertainty variable. The decision management system may allow the user to qualitatively and quantitatively fit a PDF to an existing set of values for the uncertainty variable (possibly from analogues).

It is possible that there are two or more data structures, each of which could be supplied as input to a given algorithm (or a given set of algorithms). The user may be uncertain as to which of the two or more data structures to use. For example, there may two geocellular models for the same reservoir, and, it may not be clear which model is a better representation of the physical reservoir. Thus, the user may desire to set up a flow that executes an algorithm a number of times, each time using a randomly selected one of the two or more data structures. Therefore, the decision management system may provide a mechanism for the user to create an uncertainty variable whose attainable values correspond respectively to the two or more data structures. The user may assign probability values to the two or more attainable values. Each probability value represents the probability that the corresponding data structure will be selected in any given realization of the uncertainty variable. The user may choose to construct any number of uncertainty variables of this kind. A set of data structures that are mapped to the attainable values of an uncertainty variable in this fashion are said to be "subordinated to the uncertainty variable".

Furthermore, it is possible that there are two or more data structures which represent alternative outcomes of a decision. For example, there may be two or more data structures, each of which represents a possible realization for well locations and facility pipeline connections. Thus, the decision management system may provide a mechanism for the user to create a decision variable whose attainable values correspond respectively to the two or more data structures. A set of data structures that are mapped to the attainable values of a decision variable in this fashion are said to be "subordinated to the decision variable".

Thus, the decision management system allows the user to:
(1) specify source locations for data structures, create data structures, and modify data structures, (2) promote data values in data structures to uncertainty variables and decision variables;

(3) subordinate data structures to uncertainty variables;

(4) subordinate data structures to decision variables.

Some of the data structures may be referred to as models since they describe (or characterize) systems of interest. For example, the data structures may include geocellular reservoir models, well plan models, etc. The objects resulting from the operations (2), (3) and (4) are also referred to herein as models.

The decision management system may be configured to support the use of highly rigorous physical reservoir models, well models, production flow models, and economic models.

Some of the uncertainty variables may be correlated. Thus, the decision management system allows the user to specify correlations between pairs of uncertainty variables. For example, the user may select a pair of uncertainty variables, and, enter a correlation coefficient to specify the correlation between the pair of uncertainty variables. In some embodiments, the user may select a group of two or more uncertainty variables, and, enter a correlation matrix for the group. When a flow is executed, the uncertainty variables are instantiated in a way that the respects the user-specified correlations.

Some of the uncertainty variables may have functional dependencies between them, e.g., functional dependencies of the form $Y=f(X)$, $Y=f(X_1,X_2)$, $Y=f(X_1,X_2,X_3)$, and so on, Where $X$, $X_1$, $X_2$, $X_3$ and $Y$ are uncertainty variables. Thus, the decision management system may provide a user interface which allows the user to specify such functional dependencies. Any of a wide variety of functions (including linear and nonlinear functions) may be supported. In some embodiments, the user interface allows the user to construct an arbitrary algebraic function of the uncertainty variables. When a flow is executed, the uncertainty variables are instantiated in a way that respects these functional dependencies. For example, if $Y=f(X)$, an instantiation for Y may be obtained by first instantiating X and then evaluating the function f on the instantiation of X. Similarly, the decision variables may have functional dependencies between them, e.g., functional dependencies of the form $Y=f(X)$, $Y=f(X_1,X_2)$, $Y=f(X_1,X_2,X_3)$, and so on, where $X$, $X_1$, $X_2$, $X_3$ and $Y$ are decision variables. Thus, the same user interface (or a different user interface) may be used to specify such functional dependencies between decision variables.

Some of the decision variables or functional combinations of decision variables may be constrained. Thus, the decision management system may provide a user interface which allows the user to specify constraints such as:

Y .ineq. X,

Y .ineq. f(X),

Y .ineq. $f(X_1,X_2)$,

Y .ineq. $f(X_1,X_2,X_3)$, and so forth, on decision variables such as $X$, $X_1$, $X_2$, $X_3$ and Y, where .ineq. may be any of the inequality operators $<$, $\leq$, $>$ or $\geq$. Any of a wide variety of functions f (including linear and nonlinear functions) may be supported. In some embodiments, the user interface allows the user to construct an arbitrary algebraic function of the decision variables. When a flow executes, an optimization is performed that respects the user-specified constraints on the decision variables.

The decision management system may also provide a user interface through which the user may specify an execution control data set. An execution control data set contains information for controlling and qualifying the execution of a flow. For example, an execution control data set may include information such as:

an instantiation mode for uncertainty variables in the flow, and numbers of iterations for respective loops in the flow.

In a Monte Carlo mode of instantiation, the uncertainty variables (or some subset of the uncertainty variables) may be instantiated randomly using random number generators. In a Latin hypercube mode of instantiation, the uncertainty variables (or some subset of the uncertainty variables) may be instantiated using the well known Latin hypercube method. In an experimental design mode of instantiation, the uncertainty variables (or some subset of the uncertainty variables) may be instantiated using any of various well known experimental design methods.

Over time the user may construct a number of flows, a number of sets of models, and a number of execution control data sets. The decision management system may allow the user to select a flow, a set of models and an execution control data set, and, invoke execution of the flow with respect to the execution control data set and the set of models. The decision management system may also provide the user more control over how a flow can be executed. For example, in some embodiments, a flow can executed to run specific iterations that might have failed to execute for a variety of reasons in previous executions of the flow. In other embodiments, additional iterations might be executed on flows that have been previously executed.

The decision management system may provide various tools for the user to design various different kinds of flows. For example, in some embodiments, the decision management software may include a decision flow builder that is configured to automate the process of building a flow for the optimization of decisions related to the exploitation of a set of assets (e.g., a set of oil and gas fields) in a manner that takes into account various uncertainties associated with the set of assets.

Client-Server Architecture

The decision management system may be implemented by executing decision management software on a set of one or more computers.

The decision management software may be partitioned into a client application and a server application with a communication protocol between the client application and the server application. For example, the communication protocol may be realized using remote method invocation (RMI) or WEB Services.

The client application may execute on a client computer and the server application may execute on a server computer. However, there is no requirement that the client application and server application must execute on separate computers. If a computer has sufficient computational power, both the client application and the server application may execute on that computer.

The server application may be configured to use dispatchers. A dispatcher is a program (or system of programs) configured to distribute self-contained groups of computations (e.g., iterations of a large job) to other processors (or computers) for execution on those other processors. The other processors may be distributed across a network such as a local area network, a wide area network, or the Internet. The other processors may also be part of a shared memory hardware unit such as a cluster and may be used as a single unit (e.g., in a parallel computation environment)

In some embodiments, the major modules of the client application and the server application (i.e., the flow server) may be as shown in FIG. 1.

Client and Sever Applications

The client application 100 may include a flow builder 107, a model manager 102, a flow runner 109 and an output analyzer 112.

The flow builder 107 provides a user interface through which the user states a problem and creates a flow to solve it.

The model manager 102 provides an interface through which the user may create, build and modify models including decision variables and uncertainty variables.

The flow runner 109 is used to launch the execution of flows. In response to a user request for the execution of a flow, the flow runner sends the flow along with a compatible set of models and a compatible execution control data set to the flow server so that the flow may be executed. The flow runner may also receive status information from the flow server regarding currently executing flows and pending flows and display the status information to the user. The flow server may send the results of a flow execution back to the flow runner, and/or, store the results in a database.

The flow server may include a remote API 160 for communicating with client applications such as client application 160.

The output analyzer 112 allows a user to perform data analysis on the results of flow execution.

The flow server 155 may execute flows (or, direct the execution of flows) which are submitted as jobs from the client application. The flow server 155 may provide status information about the jobs that are being executed to the flow runner. The flow server also allows jobs to be cancelled.

Client Application Modules

As noted above, the client application may be partitioned into a number of modules as suggested in FIG. 1. Each module may have an associated API (application programming interface), through which the different modules communicate. Thus, the client application may include a model manager API 103, a decision flow builder API 106, a flow builder API 108, a flow runner API 110 and an output analyzer API 113.

In some embodiments, these APIs are the only allowed interface between the modules, thus enabling the modules to be developed independently.

Each of the modules that require communication with external applications may also have a remote API. Thus, in some embodiments, the client application may include a model manager remote API 104 and a flow runner remote API 111.

Model Manager

The model manager 102 may provide an interface which allows the user to import, create, edit and maintain models, e.g., models including uncertainty variables and decision variables as described above. The model manager may also maintain the models in projects or other organizations specified by the user.

The types of data structures to be included in the models targeted for a given flow will depend on the algorithms included in the flow. Thus, the model manager may communicate with the flow builder to ensure that the user supplies data structures that are consistent with the algorithms of the given flow. For example, the model manager may receive from the flow builder a list of algorithms in the flow. The model manager may then focus on prompting the user for the types of data structures appropriate for the listed algorithms. Conversely, the models chosen by user might dictate the type of flow that can be executed. Thus, if the user builds and supplies a data structure, the user might then be prompted to choose from only those flows that are capable of executing that model.

In some embodiments, the model manager may be configured to invoke well known software tools to create and edit certain types of models. For example, each model may have a specific type, and, each type may have a specific tool registered to allow its creation, editing, viewing, etc. This design may be similar to the JavaBean Property Editors, which allow a custom GUI (graphical user interface) to be registered against a JavaBean. Furthermore, this design may utilize some of the notions within the JavaBeans Activation Framework.

As the data structures supplied by the user may not necessarily include decision variables or uncertainty variables, the model manager may provide generic mechanisms for promoting data values in data structures to decision variables and uncertainty variables with data structures and for subordinating data structures to decision variables and uncertainty variables.

The model manager may function as a case manager, allowing an existing model to be cloned and sub-components altered.

Flow Builder

Algorithms are the building blocks of flows. An algorithm can be viewed as a process that has inputs and generates outputs. A flow is a set of algorithms that have been linked together to perform a certain task. It is noted that a flow can itself be converted into an algorithm if desired.

The flow builder 107 provides a user interface (UI) through which the user may build arbitrary flows. For example, the flow builder may allow the user to select algorithms from a set of available algorithms and connect the algorithms together (i.e., connect the outputs of algorithms to the inputs of other algorithms) to form a flow. The set of available algorithms may include a variety of algorithms useful to one planning the exploration, development and/or operation of set of fields, e.g., algorithms such as geology or geostatistics simulators, material balance simulators, reservoir flow simulators, well tubing simulators, facility process simulators, pipeline network simulators, and economic algorithms. In some embodiments the simulators may be configured using one or more commercial or open source tools (e.g. Landmark's VIP reservoir simulator or another finite-difference, finite-element, or streamline simulator, Petex GAP surface pipe line simulator, Microsoft's Excel, Petex MBAL material balance simulator, GSLIB geostatisics generator).

Furthermore, the flow builder may allow the user to build algorithms from scratch, or, import programs that are to be used as algorithms. In some embodiments, the flow builder may allow the user to specify an arbitrary algebraic function as an algorithm, or, import a neural network to use as an algorithm.

In one set of embodiments, when forming directed connections between algorithms, the flow builder may impose data type restrictions. For example, the flow builder may allow an integer output from one algorithm to be connected to a floating point input of a second algorithm, but disallow a connection from a float output to an integer input.

The flow builder may incorporate a search engine for finding algorithms. The search engine may support searching on algorithm category (such as "production profile algorithm"), type of input, type of output, etc.

In some embodiments, the flow builder may be configured using one or more commercial tools (e.g., Landmark's DecisionSpace Decision Management System).

Once created, algorithms and flows may be registered with the model manager as:
- usable by the user;
- usable by project members;
- usable within the company;
- ready for external distribution to customers.

Flow Runner

The flow runner 109 may provide a user interface that allows the user to invoke execution of flows. When the user asserts a command to invoke execution of a flow with respect to a set of models and an execution control data set, the flow runner assembles a job including the flow, the set of models and the execution control data set, and, submits the job to the flow server. The flow server may generate a unique ID for the job and send the job ID to the flow runner. The flow runner may record the job ID.

In addition to acquiring flows from the flow builder and models from the model manager, the flow runner may also load the description of a flow and its related models from a set of input files (e.g., XML files) specified by the user.

The flow runner may display a list of jobs including jobs that are currently running (including their current status) and jobs that are pending. The flow runner interface allows the user to cancel jobs. Furthermore, the flow runner interface may allow the user to access any results already available for a job. The results may be displayed through the output analyzer's user interface.

The flow runner may be configured to submit jobs to any of a plurality of flow servers. The flow servers may execute on a number of computers through a network. The flow runner may allow the client to decide which flow server a job is to be submitted to. Different flow servers may be customized for executing different kinds of jobs.

Output Analyzer

The primary purpose of the output analyzer 112 may be to provide a means for the user to comprehend the output data obtained from executing a job (i.e., a flow with respect to a specified set of models and execution control data set). The output data may be complex since the flow may have a complex structure, e.g., a structure with an outer loop and multiple inner loops.

The output analyzer may be configured to allow the user to examine the output data from a completed flow, and, to view results from a flow still executing on the flow server.

The output analyzer may have access to a full suite of data analysis tools, as well as being able to format the output data so it can be analyzed in a third party tool (such as Microsoft Excel).

Results Calculator Interface

The client application may also include a results calculator interface (not illustrated in the Figures). The results calculator interface allows the user to specify special calculations that are to be embedded in a flow. The special calculations may be useful when the output of a first algorithm (or first set of algorithms) is not exactly the input required by a second algorithm (or second set of algorithms) but can be used to calculate the input required by the second algorithm. The results calculator interface allows the user to:
- select one or more output arguments of a first set of one or more algorithms of a flow, and
- specify a function (e.g., an arbitrary algebraic function) of the one or more output arguments;
- specify an input argument of a second algorithm (different from the one or more algorithms of the first set) that is to receive the result of evaluating the function on the selected output arguments.

The flow builder or the decision flow builder may use this information to generate a result calculator algorithm that implements the specified function, to embed the result calculator algorithm into the flow between the first set of algorithms and the second algorithm. The user may specify any desired number of special calculations to be performed (at the time of flow execution) between algorithms or sets of algorithms in a flow.

Flow Server

The flow server 155 may be partitioned into a number of separate modules, e.g., as suggested in FIG. 1. The flow server may be configured to execute jobs. A job includes a flow and an input data set.

Depending on the number of jobs the flow server is capable of running concurrently, the flow server may queue pending executions. The flow server may have the ability to cancel jobs or change the priority of jobs.

A simple user interface (UI) may be provided to the flow server (e.g., in the form of HTML).

The flow server may typically execute on a different computer than the client application. However, the flow server may also execute on the same computer as the client application.

The flow server holds a conversation with the flow runner, informing the flow runner on the status of jobs, etc.

The communication between the flow runner and the flow server may be based on any of a wide variety of known protocols such as RMI or WEB Services.

Algorithms, Models, Iterators & Dispatchers

The decision management system is configured to execute flows which include a set of interconnected algorithms. The flow may operate on models with associated uncertainty variables and decision variables as input. For example, models may include data values that have been promoted to decision variables, data values that have been promoted to uncertainty variables, data structures that are subordinated to decision variables, data structures that are subordinated to uncertainty variables, or, any combination thereof.

A flow may include loops configured to iteratively execute sets of algorithms. Dispatchers may be used to distribute iterations to multiple computers for parallel execution.

A default dispatcher, which executes all the iterations of its associated loop on the local host computer, may be provided.

A network dispatcher, which searches for available computers on a network and distributes iterations to those available computers, may also be provided.

A grid dispatcher, which distributes iterations to a grid of computers, may also be provided.

The number of models, especially memory-resident models, and the number of algorithms that act upon the models is very likely increase over time. Thus, the decision management system may be configured to allow new models and algorithms to be plugged in at will.

In some embodiments, the decision management system may have a command type interface. User inputs directed through the command type interface may be captured and stored. This provides a means for repeating a set of interactions if desired.

Decision Flow Builder

The client application of the decision management software may also include a decision flow builder. The decision flow builder may provide a user interface that accelerates the process of building a flow for the optimization of decisions relating to the exploration, development and production of assets such as oil and gas fields.

In some embodiments, the decision flow builder may be specially configured to accelerate the construction of a flow including an outer optimization loop and a set of inner "uncertainty exploration" loops, e.g., one inner loop per asset.

The decision flow builder may provide a graphical user interface through which the user may:
a) specify the names of assets to be analyzed;
b) specify a type for each of the assets, e.g., from types such as exploration field, development field, and production field;
c) specify one or more algorithms (e.g., process simulation algorithms) to be included in an inner loop for each asset;
d) specify sources of data structures consistent with the algorithms specified in (c);
e) operate on the data structures to build models for each of the assets, where the models may include uncertainty variables and/or decision variables as described above;
f) specify global decision variables and global uncertainty variables;
g) specify functional dependencies between uncertainty variables and functional dependencies between decision variables, including functional dependencies within assets and across assets;
h) specify correlations between uncertainty variables, including correlations between uncertainty variables within assets and across assets;
i) specify constraints on the decision variables or functional combinations of the decision variables;
j1) specify one or more quantities of interest for each asset $A(k)$, $k=1, 2, \ldots, N_A$, where each of the quantities represents a functional combination of one or more of the output arguments of the algorithms associated with the asset $A(k)$;
j2) specify statistics to be computed for each asset $A(k)$, $k=1, 2, \ldots, N_A$, based on the one or more specified quantities for the asset $A(k)$;
k1) specify a global objective S as a functional combination of a first subset of the statistics;
k2) specify one or more auxiliary functions, each auxiliary function being a functional combination of a corresponding subset of the statistics;
k3) specify one or more constraints involving the one or more auxiliary functions and/or the global objective;
l) select an optimizer (i.e., from a set of supported optimizers) for the outer optimization loop;
m) select a dispatcher from among a set of supported dispatchers;
n) specify whether the optimization is to be a maximization or minimization;

The decision flow builder may generate a flow having an outer optimization loop and a set of inner loops according to the information specified by the user.

As noted in (b) above, the asset types may include exploration field, development field and operational field. Other types of assets are contemplated as well.

As noted in (c) above, the user may specify one or more algorithms (e.g., process simulation algorithms) to be included in an inner loop for each asset. The decision flow builder may receive user input specifying a particular asset on which attention is to be currently focused, and, display a list (or some graphical representation) of a set of algorithms, appropriate for the type of the asset under consideration, from which the user may choose. Different kinds of algorithms are appropriate for different assets.

As noted in (d) above, the user may specify sources of data structures consistent with the algorithms specified in (c). For example, the decision flow builder interface may be configured to allow the user to specify, for each asset, file system locations (e.g., file system locations in a computer network) for data files or data bases containing the data structures. Furthermore, the user may specify entries (or sets of entries) in databases containing the data structures.

Examples of data structures for an asset include:
(1) the asset's subsurface (subterranean) structural architecture, geometry and volume;
(2) the asset's subterranean 3-dimensional (3D) distribution of properties including but not limited to pore volume, hydrocarbon oil and gas saturation, water saturation, geologic lithology, faults, and fractures;
(3) the asset's physical location relative to the sea surface or land surface and the asset's geographic location;
(4) the number of wells and locations of wells that might be drilled in the future for the asset;
(5) the number of wells that have already been drilled for the asset;
(6) the volume of hydrocarbons associated with the asset;
(7) the potential reserves associated with the asset;
(8) the history of oil, gas, and water production associated with the asset;
(9) the history of gas and water injection associated with the asset;
(10) the types of facilities that are associated with the asset; and
(11) the types of facilities that might be constructed in the future for the asset.

Other examples of data structures include: reservoir models, economic models, pipeline network models, facility processing models, and well tubing models.

The types of data structures that are specified for an asset may depend on the types of algorithms that are to be used for the asset. For example, a material balance simulator of analytical or algebraic expressions may rely on a "tank" model for an asset, where the tank model has a single set of properties to represent the whole asset. A reservoir flow simulator with partial differential equation representation of flow in porous media and a finite difference formulation may rely on a 3-dimensional spatial reservoir model to predict flows of oil, gas and water over time. An economic algorithm may rely on an economic model including prices, tax rates and fiscal complexities to predict revenue over time. The decision flow builder may prompt the user to enter data structures of types consistent with the algorithms that have already been specified for the asset in (c).

As noted in (e) above, the user may operate on the data structures to build models for each of the assets, especially models including decision variables and uncertainty variables. For example, the user may:
promote data values in data structures to uncertainty variables
promote data values in data structures to decision variables;
subordinate data structures to uncertainty variables; and
subordinate data structures to decision variables.
Examples of decision variables for assets include:
number of wells;
surface location of wells;
size of pipelines; and
size of compressors.
well type (having attainable values such as horizontal, vertical or multilateral);
well geometry;
well drilling path (in a reservoir associated with the asset);
platform type (having attainable values such as subsea and tension leg);

a decision variable subordinating a set of well drilling schedules;

a decision variable subordinating a set of well completion schedules;

a decision variable subordinating a set of facility implementation schedules.

Examples of uncertainty variables for assets include:

volume of hydrocarbons;

producibility of hydrocarbons;

cost of wells and/or facilities; and prices of oil and gas.

Global decision variables are decision variables that are not uniquely associated with a single asset. For example, the amount of capital to be available for the set of assets is an example of a global decision variable. Global uncertainty variables are uncertainty variables that are not uniquely associated with a single asset. For example, oil price is an example of a global uncertainty variable.

As noted in (g) above, the user may specify functional dependencies between uncertainty variables and functional dependencies between decision variables. In some embodiments, the decision flow builder interface may be configured to allow the user to:

select an uncertainty variable (from the set $V_{UN}$ of uncertainty variables associated with the current problem) to be a dependent variable, and, select one or more other uncertainty variables (from the set $V_{UN}$) to be independent variables; and specify a function (e.g., an arbitrary algebraic function) of the independent variables in order to define a functional dependency between the independent variables and the dependent variable.

The set $V_{UN}$ of uncertainty variables associated with the current problem includes the uncertainty variables specified in (e) and the global uncertainty variables.

Furthermore, the decision flow builder interface may be configured to allow the user to:

select a decision variable (from the set $V_D$ of decision variables associated with the current problem) to be a dependent variable, and, select one or more other decision variables (from the set $V_D$) to be independent variables; and specify a function (e.g., an arbitrary algebraic function) of the independent variables in order to define a functional dependency between the independent variables and the dependent variable.

The set $V_D$ of uncertainty variables associated with the current problem may include the global decision variables and the decision variables specified in (e).

The decision flow builder may allow the user to specify any number of functional dependencies by repeated use of the decision flow builder interface as described above. For example, the user may specify functional dependencies of the following forms:

functional dependency between uncertainty variables (or decision variables) within an asset, i.e., where the dependent variable and the one or more independent variables belong to the same asset;

functional dependency between uncertainty variables (or decision variables) across assets, i.e., where the dependent variable and the one or more independent variables belong to two or more assets; and function dependency between uncertainty variables (or decision variables) where the dependent variable, and/or, one or more of the independent variables are global variables.

An "algebraic function" is a function which is determined by an expression involving only the algebraic operations of addition, subtraction, multiplication, division, integer (or rational) root extraction, and integer (or rational) powers on the function arguments.

As noted in (h) above, the user may specify correlations between uncertainty variables. In one set of embodiments, decision flow builder interface may be configured to allow the user to:

select a pair of uncertainty variables from the set $V_{UN}$ of uncertainty variables, and, enter a correlation coefficient to specify the correlation between the pair of uncertainty variables.

The user may specify any number of such correlations by repeated use of the decision flow builder interface as described above. For example, the user may specify correlations between pairs of uncertainty variables having the following forms:

pair of uncertainty variables within an asset (i.e., associated the same asset);

pair of uncertainty variables across assets (i.e., where one variable of the pair belongs to one asset and the other variable of the pair belong to another asset);

pair of uncertainty variables where one or both are global uncertainty variables.

In some embodiments, the user may select a group of two or more uncertainty variables, and, enter a correlation matrix for the group.

When a flow is executed, the uncertainty variables are instantiated in a way that respects the user-specified correlations.

As noted in (i) above, the user may specify constraints on the decision variables or functional combinations of the decision variables. In one set of embodiments, the decision flow builder interface may be configured to allow the user to:

select a first decision variable Y from the set $V_D$ of decision variables;

select a set of one or more decision variables $X_1, X_2, \ldots, X_N$ (different from Y) from the set $V_D$ of decision variables, where N is a positive integer;

optionally specify a function f (e.g., an arbitrary algebraic function) of the one or more decision variables $X_1, X_2, \ldots, X_N$, and select an inequality operator denoted ".ineq." from the set $\{<, \leq, > \text{ or } \geq\}$, in order to define a constraint of the form Y .ineq. $f(X_1, X_2, \ldots, X_N)$.

Furthermore, the decision flow builder interface may be configured to allow the user to specify constraints of the form: Y .ineq. C, where C is a user-specified constant.

The set $V_D$ of decision variables may include the global decision variables and the decision variables specified in (e). Any of a wide variety of functions f (including linear and nonlinear functions) may be supported. In some embodiments, the decision flow builder interface allows the user to construct an arbitrary algebraic function of the selected decision variables $X_1, X_2, \ldots, X_N$.

The decision flow builder interface may be configured to allow the user to specify any number of constraints on the decision variables by repeated use of the decision flow builder interface as described above. For example, the user may specify constraints having the following forms:

constraint on decision variables within an asset, i.e., where the decision variables involved in the constraint are all associated with the same asset;

constraint on decision variables across assets, i.e., where the decision variables involved in the constraint are associated with two or more assets;

constraint on decision variables including one or more global decision variables.

When a flow executes, an optimization is performed that respects the user-specified constraints.

As noted in (j1) above, the user may specify one or more quantities of interest for each asset $A(k)$, $k=1, 2, \ldots, N_A$. In one set of embodiments, the user may specify a quantity for the asset $A(k)$ by:

selecting one or more output arguments from the algorithms associated with asset $A(k)$ and/or selecting one or more quantities that have been previously specified for the asset $A(k)$; and specifying a function (e.g., an arbitrary algebraic function) of the selected output arguments and/or previously specified quantities.

Any number of quantities may be specified for each asset using this procedure.

Furthermore, the decision flow builder interface may display a list of commonly used quantities appropriate for the kinds of algorithms that are associated with the asset $A(k)$ under current consideration. The user may specify quantities of interest by selecting quantities from the list.

Examples of quantities of interest, for an asset include quantities such as net present value, total reserves, total produced oil, etc.

As noted in (j2), the user may specify statistics to be computed for each asset $A(k)$, $k=1, 2, \ldots, N_A$, i.e., statistics on the one or more quantities that have been specified for the asset $A(k)$. In one set of embodiments, the decision flow builder interface may allow the user to specify a statistic for each of the one or more quantities that have been specified for each asset by:

entering a mathematical expression defining the statistic, or selecting the statistic from a list of commonly used statistics.

Examples of commonly used statistics include:

the mean, the standard deviation;

the quantile of order p, where p is a user-specified value between zero and one.

Furthermore, the decision flow builder interface may allow the user to specify more than one statistic on the same quantity. For example, the user may wish to compute both the mean and the standard deviation of net present value for an asset.

As part of the execution of a flow, the one or more quantities specified for each asset may be evaluated a number of times resulting in a population of values for each quantity. Each statistic specified for a quantity is computed on the corresponding population.

As noted in (k1) above, the user may specify a global objective S as a functional combination of a first subset of the statistics. To this end, in one set of embodiments, the decision flow builder interface may be configured to allow the user to:

define the first subset by selecting one or more of the statistics that have been specified for each asset; and specify a function (e.g., a linear combination or an arbitrary algebraic function) of the statistics of the first subset.

In one typical scenario, the user may select one statistic $S_k$ corresponding to each asset $A(k)$, $k=1, 2, \ldots, N_A$, and, specify the global objective S as a linear combination of the form $$S = \sum_{k=1}^{N_A} c_k S_k.$$

The user may enter the values of the coefficients $c_k$ that are to multiply the respective statistics $S_k$. As an example, the user may configure the global objective S to represent a linear combination of the mean net present value for each asset $A(k)$.

As noted above in (k2), the user may specify one or more auxiliary functions, each auxiliary function being a functional combination of a corresponding subset of the statistics. In one set of embodiments, in order to specify an auxiliary function, the decision flow builder interface may allow the user to:

select one or more of the statistics that have been specified for each asset; and specify a function (e.g., an arbitrary algebraic function) of the statistics of the selected statistics.

The user specify any number of auxiliary functions using this procedure.

In one typical scenario, the user may define an auxiliary function H by selecting one statistic $T_k$ corresponding to each asset $A(k)$, $k=1, 2, \ldots, N_A$, and, specifying a linear combination of the form $$H = \sum_{k=1}^{N_A} a_k T_k$$

or of the form $$H = \sum_{k=1}^{N_A} a_k T_k^2.$$

The user may enter the values of the coefficients $a_k$ that are to multiply the respective statistics. As an example, the user may configure the auxiliary function H to represent a linear combination of the squared standard deviation of net present value for each asset $A(k)$.

As noted in (k3) above, the user may specify one or more constraints involving the one or more auxiliary functions and/or the global objective S. In one set of embodiments, the user may specify one or more constraints each having the form J.rel.C, where J is a user-specified function whose arguments are selected from the set $F_C$ including the one or more auxiliary functions and the global objective function S, where .rel. is a relation selected from the set $\{<, \leq, >, \geq, =\}$, where C is a user-specified constant. The user may specify such a constraint by:

selecting one or more arguments for the function J from the set $F_C$;

specifying a functional combination (e.g., an arbitrary algebraic functional combination) of the one or more selected arguments;

selecting the relation .rel. from the set $\{<, \leq, >, \geq, =\}$; and specifying the constant C.

Any number of constraints may be specified using this procedure.

In one typical scenario, the user may rely on this procedure to specify a constraint of the form $J=H/S<C$, where H is an auxiliary function and S is the global objective. As an example, H may be a linear combination of squared NPV standard deviations, one per asset, and, S may be a linear combination of NPV means, one mean per asset.

As noted in (1) above, the user may select an optimizer. In one set of embodiments, the decision flow builder may allow the user to select from a set of supported optimizers. The global objective S is likely to be highly nonlinear and to have many local minima (or maxima) over the global space defined by the decision variables. Furthermore, this global space over which the optimization is to be performed may have isolated islands of feasible vectors in seas of infeasible vectors. Thus, it is desirable to use optimizers that do not terminate upon finding a single local minimum (or maximum) and do not get trapped inside a single island. Thus, the set of supported optimizers may include stochastic optimizers, i.e., optimizers that use randomness in their search methodology.

In some embodiments, the decision flow builder may allow the user to select from optimizers such as the following:
(1) a scatter search optimizer;
(2) a tabu search optimizer;
(3) an optimizer based on a metaheuristic combination of scatter search, tabu search, neural networks and linear programming;
(4) an optimizer based on a genetic algorithm.

The set $V_D$ of decision variables of a flow represent decisions that are subject to being controlled. Each decision variable has a user-specified set of attainable values. The Cartesian product of the attainable value sets of the decision variables in $V_D$ is a global decision space over which the optimization is to be performed, subject to any constraints the user may specify for the decision variables or functional combinations of the decision variables, and subject to the one or more constraints defined in (k3) involving the one or more auxiliary functions and/or the global objective.

A vector in the global decision space is referred to as a decision vector. In other words, a decision vector is a vector of values, i.e., one value selected from each of the attainable value sets of the decision variables in $V_D$.

In some embodiments, the decision flow builder might allow the user to supply a set of initial guess vectors that the optimizer might use in its search process.

The set $V_{UN}$ of uncertainty variables of a flow represent uncertainties. Each uncertainty variable has a user-specified set of attainable values. The Cartesian product of the attainable value sets of the uncertainty variables in $V_{UN}$ is a global uncertainty space which is to be iteratively explored. A vector in the global uncertainty space is referred to as an uncertainty vector. In other words, an uncertainty vector is a vector of values, i.e., one value selected from each of the attainable value sets of the uncertainty variables in $V_{UN}$.

Figure 2:
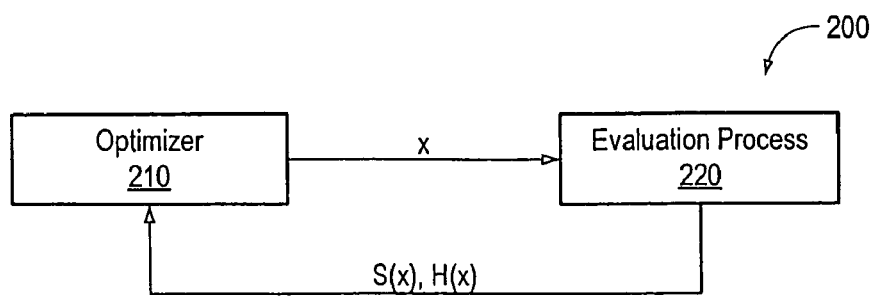
FIG. 2 illustrates one set of embodiments of a flow configured to perform an optimization analysis for decisions relating to a plurality of assets in the presence of various underlying uncertainties (which are modeled by uncertainty variables).

In some embodiments, the decision flow builder may generate a flow 200 in response to the information (a)-(n) specified by the user. The flow 200 may include the optimizer 210 selected by the user in (l) and an evaluation process 220 as illustrated in FIG. 2. The optimizer 210 may generate decision vectors x in the global decision space subject to the user-specified constraints on the decision variables. The evaluation process 220 operates on the decision vectors x to generate corresponding values $S(x)$ of the global objective S and corresponding values $H(x)$ of an auxiliary function H as described below. The global objective values $S(x)$ and the auxiliary function values $H(x)$ are supplied to the optimizer. The optimizer uses these values to generate updated decision vectors in an attempt to minimize (or maximize) the global objective subject to the user-specified constraint on the auxiliary function $H(x)$ (or on a combination of the auxiliary function and the global objective). The optimizer may operate according to any of a variety of optimization algorithms. The loop structure including the optimizer and the evaluation process is referred to herein as the "outer" loop.

Figure 3:
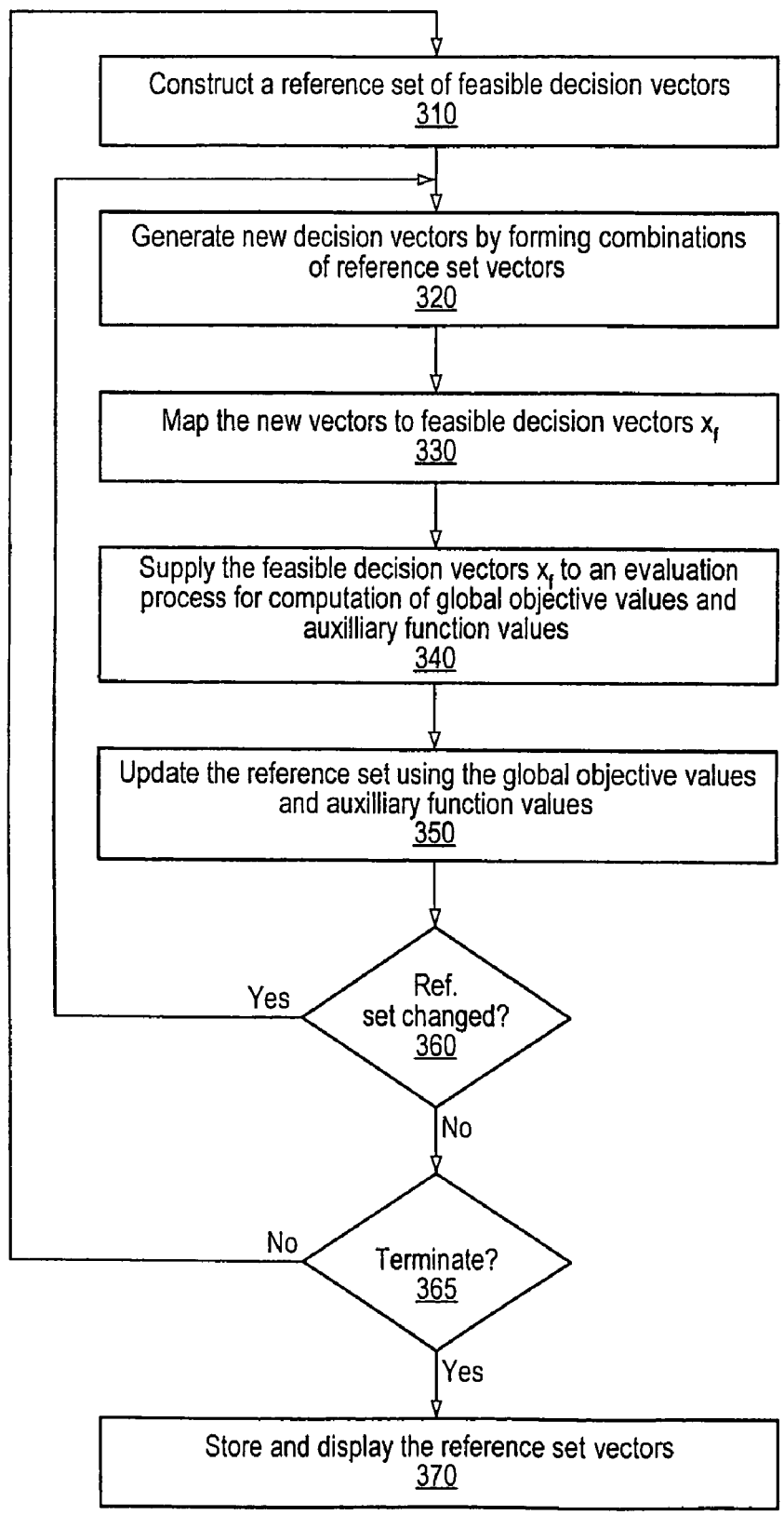
FIG. 3 illustrates one set of embodiments of optimizer 210 of FIG. 2.

In one set of embodiments, the optimizer 210 may be configured to operate according to the following methodology as illustrated in FIG. 3. The optimizer may execute on the server computer.

In operation 310, the optimizer 210 may construct a reference set of feasible decision vectors. (A decision vector is said to be feasible if it satisfies the user-specified constraints on the decision variables.) In the first iteration of operation 310, the reference set may be constructed by generating an initial set of decision vectors that are spatially diverse (e.g., using random methods) and then mapping the initial set of decision vectors to feasible decision vectors. However, in any succeeding iteration of operation 310, the reference set may be constructed by:

selecting a number $n_1$ of the "best" decision vectors from a previous version of the reference set (i.e., "best" as measured by the global objective), generating a set of spatially diverse vectors (e.g., using random methods);

mapping the diverse vectors to obtain diverse feasible vectors;

adding a number $n_2$ of the diverse feasible vectors to the $n_1$ vectors in order to increase the spatial diversity of the reference set.

The optimizer may sort the $n_1$ best decision vectors in order of their global objective values $S(x)$. The optimizer may also sort the $n_2$ additional vectors according to a distance measure.

In operation 320, the optimizer 210 may generate new vectors $X_{new}$ by forming combinations (e.g., linear combinations) of subsets of the reference set vectors. The new vectors are not necessarily feasible vectors. The subsets may include two or more reference set vectors.

In operation 330, the optimizer 210 may map the new decision vectors to feasible decision vectors $x_f$ using a linear program and/or a mixed integer program.

In operation 340, the optimizer 210 may supply the feasible decision vectors $x_f$ to the evaluation process 220 for computation of the global objective values $S(x_f)$ and the auxiliary function values $H(x_f)$ corresponding to the feasible decision vectors $x_f$.

In operation 350, the optimizer may update the reference set using the global objective values $S(x_f)$ and auxiliary function values $H(x_f)$ computed in operation 340. In one embodiment, the optimizer may examine each of the feasible vectors $x_f$ to determine:

(1) if the feasible vector has a better global objective value $H(x_f)$ than the current worst of the $n_1$ decision vectors in terms of global objective value, in which case the feasible vector $x_f$ may replace the worst vector;

(2) if the feasible vector has a larger distance measure value than the current worst of the $n_2$ additional vectors.

In either case, the optimizer may replace the worst vector with the feasible vector. If none of the feasible vectors $x_f$ satisfies either condition (1) or (2), the reference set remains the same, i.e., the update is a null update.

In operation 360, the optimizer may determine if the reference set has changed as a result of operation 350. If so, the optimizer may perform another iteration of operations 320-360. If the reference set has not changed, the optimizer may continue with operation 365.

In operation 365, the optimizer may determine if a termination condition is satisfied. If the termination condition is not satisfied, the optimizer may continue with operation 310 in order to regenerate the reference set with a different set of $n_2$ diverse feasible vectors. If the termination condition is satisfied, the optimizer may continue with operation 370.

Various termination conditions are contemplated for various embodiments. For example, the termination condition may be the condition that:
(1) at least one decision vector of the reference set has attained a global objective value better than a user-defined threshold while meeting the one or more constraints involving the one or more auxiliary functions and/or the global objective; or
(2) a given number $n_{max}$ of iterations of the outer loop (including operations 310 through 365) have been performed; or
(3) a given amount $T_{max}$ of computation time has elapsed; or
(4) any combination of (1), (2) and (3).

The maximum iteration count $n_{max}$ and the maximum compute time $T_{max}$ may be specified by the user.

In operation 370, the optimizer may store the reference set vectors along with their corresponding global objective values and auxiliary function values in a database. The output analyzer may read the database and display a graphical representation of the global objective value and auxiliary function value(s) for each of the reference set vectors (or alternatively, for the $n_1$ best vectors of the reference set).

Figure 4:
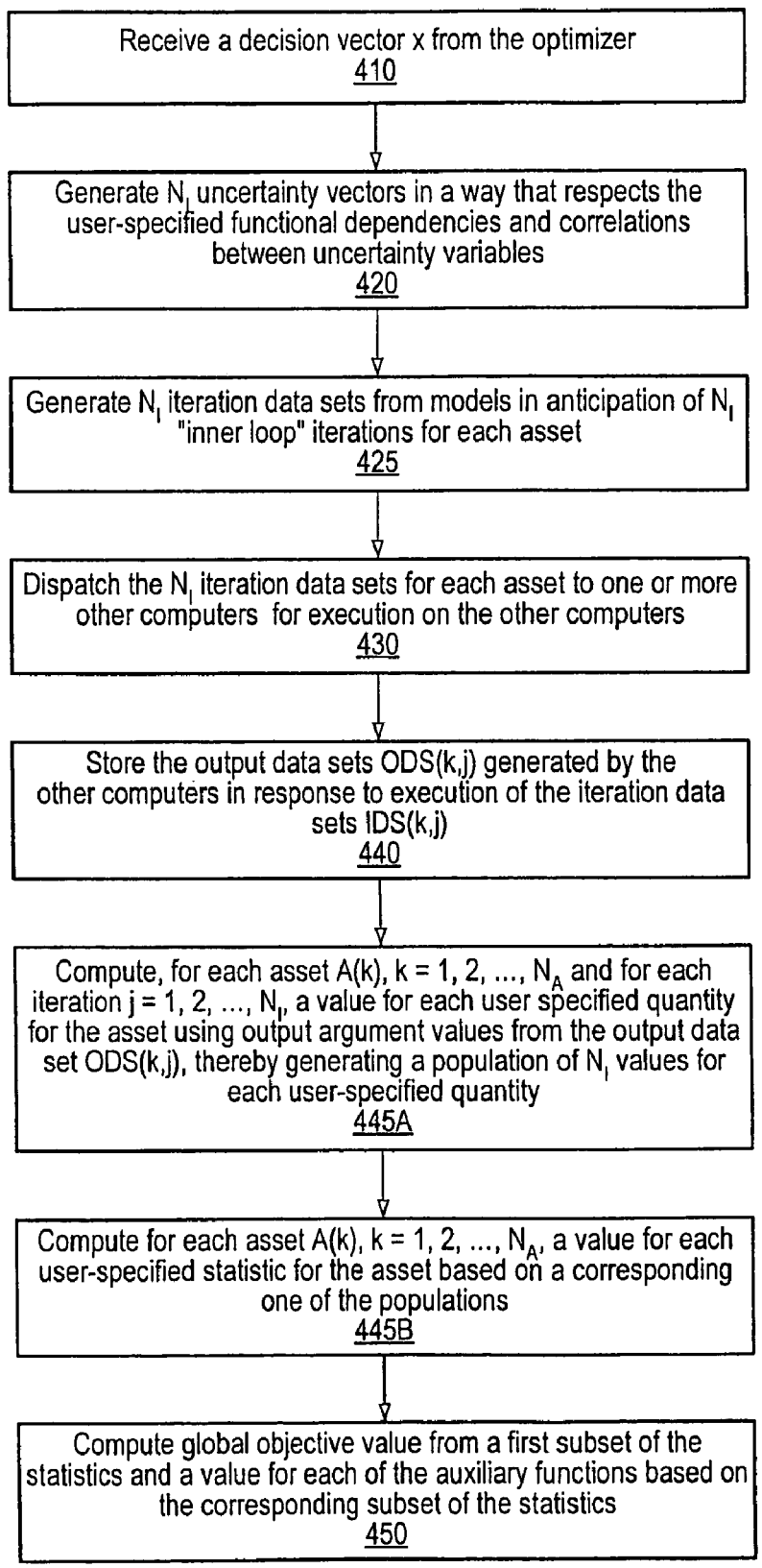
FIG. 4 illustrates one set of embodiments of the evaluation process 220 of FIG. 2.

In one set of embodiments, the evaluation process 220 may be configured to operate according to the following methodology as indicated in FIG. 4. The evaluation process may execute on the server computer.

In operation 410, the evaluation process may receive a decision vector x from the optimizer.

In operation 420, an instantiation module of the evaluation process may generate $N_I$ uncertainty vectors in a way that respects the user-specified functional dependencies and correlations between uncertainty variables, where $N_I$ is a user-specified positive integer. The $N_I$ uncertainty vectors explore the global uncertainty space. The uncertainty vectors may be generated according to a user-specified mode of instantiation as described above. Each uncertainty vector $U_j$, $j=1, 2, \ldots, N_I$, contains an instantiated value for each of the uncertainty variables in the set $V_{UN}$ (i.e., the set of all uncertainty variables associated with the current problem). Each instantiated value is selected from the attainable value set of a corresponding one of the uncertainty variables.

In operation 425, the evaluation process may generate $N_I$ iteration data sets from models in anticipation of $N_I$ "inner loop" iterations for each asset $A(k)$, $k=1, 2, \ldots, N_A$, where $N_I$ is the number of iterations and $N_A$ is the number of assets. For example, the evaluation process may generate the iteration data sets according to the following pseudo code:

```
For k = 1 to N_A:
    For j = 1 to N_I:
        Generate an iteration data set IDS(k,j) for the algorithms
        of asset A(k) using a subvector x(k) of the decision vector
        x that is relevant to asset A(k) and a subvector U_j(k) of the
        uncertainty vector U_j that is relevant to asset A(k);
        Store the iteration data set IDS(k,j) in an iteration buffer
        IBUFF(k) for asset A(k);
    End For
End For.
```

The For Loop on index k need not execute in a strictly sequential manner. For example, this For Loop may be configured to operate in a multi-threaded manner, e.g., one thread per value of k.

Recall that the decision management system allows the user to build models by:
(1) subordinating sets of data structures to decision variables;
(2) subordinating sets of data structures to uncertainty variables;
(3) promoting data values in data structures to decision variables; and
(4) promoting data values in data structures to uncertainty variables.

The values of the decision subvector x(k) and the values of the uncertainty subvector $U_j(k)$ may be used to determine one or more data structures from the models. In particular, one or more of the values of decision subvector x(k), and/or, one or more of the values of uncertainty subvector $U_j(k)$ may be used to select data structures from models including sets of alternative data structures. Furthermore, one or more values of the decision subvector x(k), and/or, one or more values of the uncertainty subvector $U_j(k)$ may be substituted into models including decision variables and/or uncertainty variables. The data structures determined by the values of the decision subvector x(k) and the values of the uncertainty subvector $U_j(k)$ may be included in the iteration data set IDS(k,j). The iteration data set may include sufficient data to execute the set of algorithms that have been assigned to asset A(k). The subvectors x(k) are not necessarily disjoint. For example, values corresponding to the global decision variables may appear in more than one of the subvectors x(k). Similarly, the subvectors $U_j(k)$ are not necessarily disjoint.

In operation 430, a dispatcher of the evaluation process may dispatch (i.e., send) the $N_I$ iteration data sets for each asset A(k), k=1, 2, ..., $N_A$, to one or more other computers, where $N_I$ is the number of iterations to be performed on each asset. For example, the dispatcher may operate according to the following pseudo code:

```
For k = 1 to N_A:
    While (Iteration buffer IBUFF(k) is nonempty):
        Locate an available computer C_P;
        Read one or more iteration data sets IDS(k,j) from the
        iteration buffer IBUFF(k);
        Compress the one or more iteration data sets and package the
        compressed data into an execution data file;
        Send the execution data file to the computer C_P for execution of
        each of the one or more iteration data sets on the computer C_P;
    EndWhile
EndFor.
```

The dispatcher may include a copy of the executable code for the algorithms associated with asset A(k) into the execution data file in the case that the computer $C_P$ does not already have a copy of this code. Furthermore, the dispatcher may include an address of a data buffer INB(k) associated with asset A(k) into the execution data file. The data buffer INB(k) may be allocated in the memory of the server computer. The computer $C_P$ executes the set of algorithms associated with asset A(k) on each iteration data set IDS(k,j) included in the execution data file, collects the output data (of the algorithms) from the execution into a corresponding output data set ODS(k,j), and sends the output data set ODS(k,j) to the data buffer INB(k).

The For Loop on index k need not execute in a strictly sequential manner. For example, this For Loop may be configured to operate in a multi-threaded manner, e.g., one thread per value of k.

Furthermore, operation 425 and 430 need not execute in a strictly sequential manner. For example, the multiple threads of the For loop in operation 430 may be executed in an multi-threaded fashion with the multiple threads of the For loop (on index k) in operation 425. In one embodiment, the $k^{th}$ dispatch thread may be started soon after the $k^{th}$ IDS generation thread is started. For example, the $k^{th}$ IDS generation thread may start the $k^{th}$ dispatch thread after having stored one or more iteration data sets into iteration buffer IBUFF(k).

The server computer may include one or more processors.

In operation 440, a results accumulator of the evaluation process may store the output data sets ODS(k,j) generated by the other computers (to which the execution data sets were distributed). The output data set ODS(k,j) represents the output of the algorithms associated with asset A(k) having been executed on the iteration data set IDS(k,j). In one set of embodiments, the results accumulator may operate according to the following pseudo code:

```
For k = 1 to N_A:
    j ← 0;
    While (j ≤ N_I):
        Receive output data set ODS(k,j) from input buffer INB(k);
        Decompress payload data of the output data set ODS(k,j);
        Store the decompressed data of the output data ODS(k,j) in a
            database (e.g., in a database indexed by k and j);
        j ← j+1;
    EndWhile
EndFor.
```

The For loop on index k need not execute in a strictly sequential fashion. For example, this For Loop may be configured to operate in a multi-threaded manner, e.g., one thread per value of k.

Furthermore, the operation 430 and 440 need not execute in a strictly sequential fashion. For example, the multiple threads of the For loop in operation 440 may be executed in an multi-threaded fashion with the multiple threads of the For loop in operation 430. In one embodiment, the $k^{th}$ accumulation thread may be started soon after the $k^{th}$ dispatch thread is started. For example, the $k^{th}$ dispatch thread may start the $k^{th}$ accumulation thread after having dispatched a first execution data file for asset A(k).

In operation 445A, a results calculator of the evaluation process may compute for each asset A(k), k=1, 2, ..., $N_A$, and for each iteration j=1, 2, ..., $N_I$, a value for each user specified quantity for the asset using output argument values from the output data set ODS(k,j). Thus, the results calculator generates a population of $N_I$ values for each user-specified quantity.

In operation 445B, the results calculator may compute for each asset A(k), k=1, 2, ..., $N_A$, a value for each user-specified statistic for the asset based on a corresponding one of the populations.

Operations 445A and 445B are collectively referred to as operation 445.

In one set of embodiments, the results calculator may be configured to implement operation 445 according to the following pseudo code:

```
For k = 1 to N_A:
    j ← 0;
    While (j ≤ N_I):
        For each user-specified quantity associated with asset A(k):
            Read output argument value(s) from output data set
                ODS(k,j) for the computation of a value of the user-
                specified quantity;
            Compute and store the quantity value;
        EndFor
        j ← j+i;
    EndWhile
    For each user-specified statistic associated with asset A(k):
        Compute a value of the user-specified statistic from the N_I
            values of the corresponding user-specified quantity.
    EndFor
EndFor.
```

The For loop on index k need not execute in a strictly sequential fashion. For example, this For Loop may be configured to operate in a multi-threaded manner, e.g., one thread per value of k.

Furthermore, the operation 440 and 445 need not execute in a strictly sequential fashion. For example, the multiple threads of the For loop in operation 445 may be executed in an multi-threaded fashion with the multiple threads of the For loop in operation 440. In one embodiment, the $k^{th}$ results calculation thread may be started soon after the $k^{th}$ results accumulation thread has started. For example, the $k^{th}$ results accumulation thread may start the $k^{th}$ results calculation thread after having stored a first of the output data sets ODS (k,j) into the database.

In operation 450, a global results calculator may compute:
the value S(x) of the global objective S based on the user-specified first subset of the set $G_T$ of statistics (i.e., the union of the statistics from each asset);
a value of each auxiliary function based on the corresponding user-specified subset of the total set $G_T$ of statistics.

Figure 5:
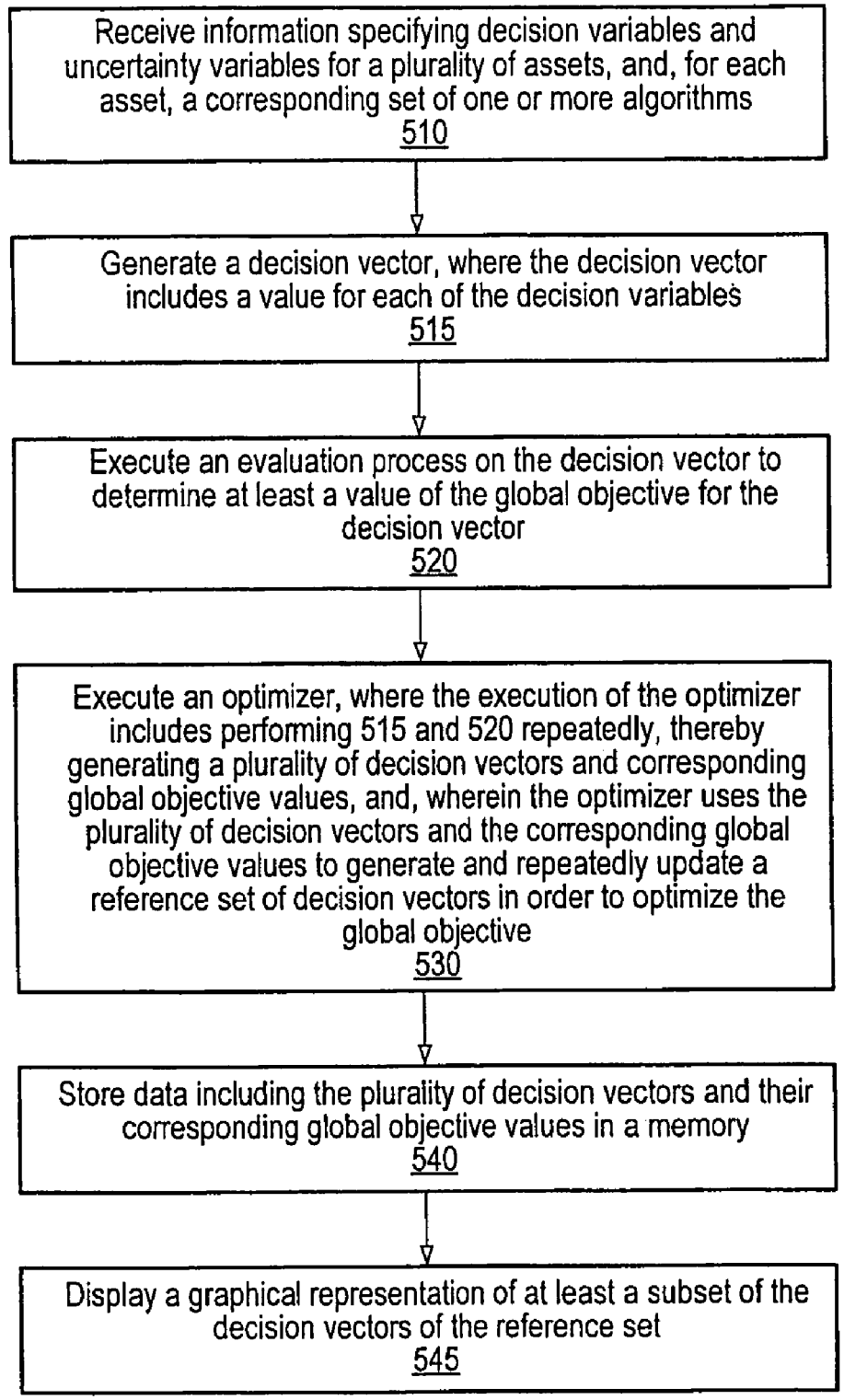
FIG. 5 illustrates one set of embodiments of a method for optimizing decisions regarding a plurality of assets.

In one set of embodiments, a method for optimizing decisions regarding a plurality of assets may involve the following operations as illustrated in FIG. 5.

In operation 510, a computer (e.g., a server computer including one or more processors) may receive information specifying:
decision variables and uncertainty variables for a plurality of assets, and
for each asset a corresponding set of one or more algorithms.

In operation 515, the computer may generate a decision vector. The decision vector includes a value for each of the decision variables. Each of the decision variables has an associated set of attainable values.

In operation 520, the computer may execute an evaluation process on the decision vector to determine at least a value of a global objective for the decision vector. See below for a description of the evaluation process.

In operation 530, the computer may execute an optimizer. The execution of the optimizer includes performing operations 515 and 520 repeatedly, thereby generating a plurality of decision vectors and corresponding global objective values. The optimizer uses the plurality of decision vectors and the corresponding global objective values to generate and repeatedly update a reference set of decision vectors in order to optimize the global objective.

In operation 540, the computer may store data including the plurality of decision vectors and their corresponding global objective values in a memory (e.g., in the system memory of the computer).

In operation 545, the computer may display a graphical representation of at least a subset of the decision vectors of the reference set.

The optimizer may be realized by any of variety of optimizers, especially stochastic optimizers. For example, the optimizer may be:

(1) a scatter search optimizer;
(2) a tabu search optimizer;
(3) an optimizer based on a metaheuristic combination of scatter search, tabu search, neural networks and linear programming; or
(4) an optimizer based on a genetic algorithm.

Figure 6:
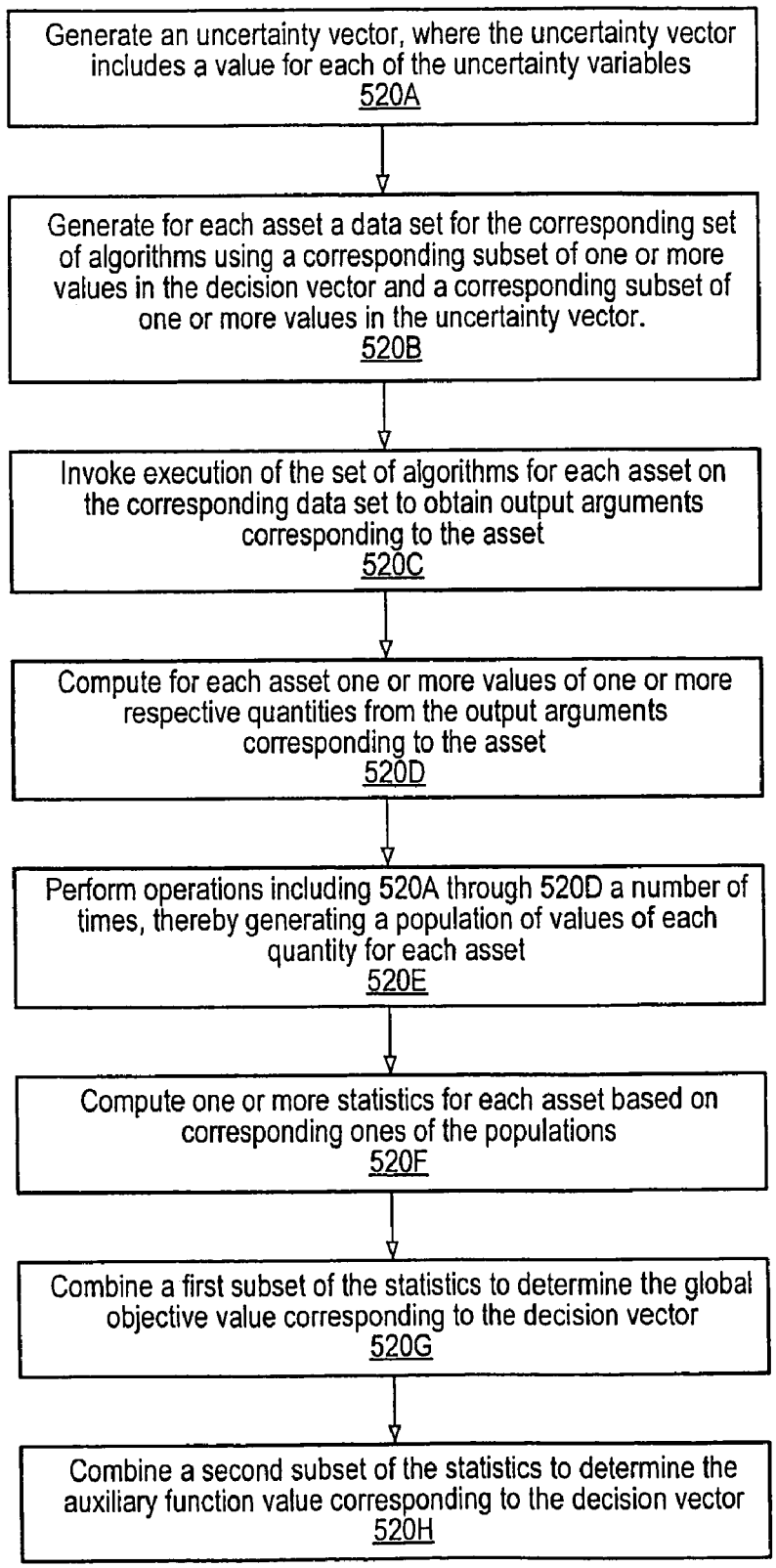
FIG. 6 illustrates one set of embodiments of operation 520 (i.e., the operation of executing the evaluation process) of FIG. 5.

The operation 520 of executing the evaluation process may include the following operations as illustrated in FIG. 6.

In operation 520A, the computer may generate an uncertainty vector. The uncertainty vector includes a value for each of the uncertainty variables.

In operation 520B, the computer may generate for each asset a data set for the corresponding set of algorithms using a corresponding subset of one or more values in the decision vector and a corresponding subset of one or more values in the uncertainty vector.

In operation 520C, the computer may invoke execution of the set of algorithms for each asset on the corresponding data set to obtain output arguments corresponding to the asset. The computer may invoke execution on other computers, e.g., by sending the data sets to the other computers (and the executable code for the respective algorithms if necessary).

In operation 520D, the computer may compute for each asset one or more values of one or more respective quantities from the output arguments corresponding to the asset.

In operation 520E, the computer may perform operations including 520A through 520D a number of times, thereby generating a population of values of each quantity for each asset.

In operation 520F, the computer may compute one or more statistics for each asset based on corresponding ones of the populations.

In operation 520G, the computer may combine a first subset of the statistics to determine the global objective value corresponding to the decision vector. The first subset of statistics may be combined according to a user-specified functional combination (e.g., a linear combination).

The information (referred to in 510 above) may specify one or more functional dependencies among the uncertainty variables. The operation 520A of generating the uncertainty vector may be performed in a manner that respects the one or more functional dependencies among the uncertainty variables. The user may specify the functional dependencies, e.g., through a client GUI that executes on another computer (e.g., a client computer).

The information may also specify one or more correlations among the uncertainty variables. In this case, the operation 520A of generating the uncertainty vector may be performed in a manner that respects said correlations. The uncertainty variables may include two or more subsets associated with two or more of the assets respectively. The correlations may include correlations between uncertainty variables across different assets.

The information may also specify one or more constraints on the decision variables. In this case, the operation 515 of generating the decision vector may respect the one or more constraints on the decision variables.

The operation 520 of executing the evaluation process on the decision vector may produce a corresponding value of an auxiliary function in addition to said global objective value. Thus, the operation 520 may additionally include:

(520H) combining a second subset of the statistics to determine the auxiliary function value corresponding to the decision vector.

The optimizer may use the global objective values and the auxiliary function values corresponding to the plurality of decision vectors in said repeated updating of the reference set in order to optimize the objective function subject to one or more constraints.

The user may specify the structure of the one or more constraints. For example, the user may specify a constraint on a functional combination of the auxiliary function and the global objective. (The functional combination may itself be specified by the user.) As another example, the user may specify a constraint just on the auxiliary function.

The operation 520H may include combining the second subset of the statistics according to a linear combination whose coefficients are specified by said information.

Each of the decision variables has an associated set of attainable values representing possible outcomes of a corresponding decision. Furthermore, each of the uncertainty variables has an associated set of attainable values. The attainable value sets may be finite sets of numeric values, data structures, programs, etc. The attainable value sets may also be intervals of the number line, or more generally, user-specified regions in an n-dimensional space, where n is a positive integer.

In one embodiment, a plot of the global objective value versus auxiliary function value for each of said plurality of decision vectors may be displayed using a display device (such as monitor, projector, head mounted display, etc.).

The operation 540 of storing the data may include storing the plurality of decision vectors along with their corresponding global objective values and the corresponding auxiliary function values in a database in the memory.

In some embodiments, the computer may:
operate on the database to identify a subset of the plurality of decision vectors that have optimal values of the global objective for a given auxiliary function value.
repeat said operating for a plurality of auxiliary function values; and
store the subsets identified in said repeating.

Furthermore, the computer may also:
operate on the database to determine a locus of optimal values of the global objective with respect to the auxiliary function value; and
display the locus of optimal values.

A graphical representation of a subset of the plurality of decision vectors that corresponds to a point on the optimal value locus may be displayed in response to a user's selection of the point.

The user may specify the plurality of assets, the decision variables and the uncertainty variables for each asset, and a set of one or more algorithms for each asset. The decision variables are variables that are subject to optimization. The uncertainty variables may be randomly (or pseudo-randomly) explored to create variation in the input supplied to algorithms of each asset.

The set of one or more algorithms for at least one of the assets may include an algorithm to estimate oil and gas production over time and economics for the asset. The algorithm to estimate oil and gas production over time may be:

a material balance simulator that operates on a tank model data structure;
a material balance calculation performed in spreadsheet models;
a reservoir flow simulator that operates on a 3-dimensional (3D) data structure;

an algorithm defined by a set of one or more user-specified algebraic expressions.

Furthermore, the set of one or more algorithms for at least one of the assets may include one or more of:

an algorithm to estimate oil and gas transport at the surface, e.g., a surface pipeline network process simulator, an algorithm to estimate oil, gas and water transport at the surface, e.g., a surface pipeline network analytical model or a set of one or more user-specified algebraic expressions, and an algorithm to estimate oil and gas volume and 3D reservoir properties.

The algorithm to estimate oil and gas volume and 3D reservoir properties may be realized by:

a subsurface property generation geostatistical algorithm, defined by a set of one or more user-specified algebraic expressions; or a material balance simulator.

The algorithm to calculate the economics of the asset may be realized by:

algorithms based on spreadsheets that may include full fiscal models and production sharing models;

algorithms based on analytical economic models and a set of one or more user-specified algebraic expressions.

Figure 7:
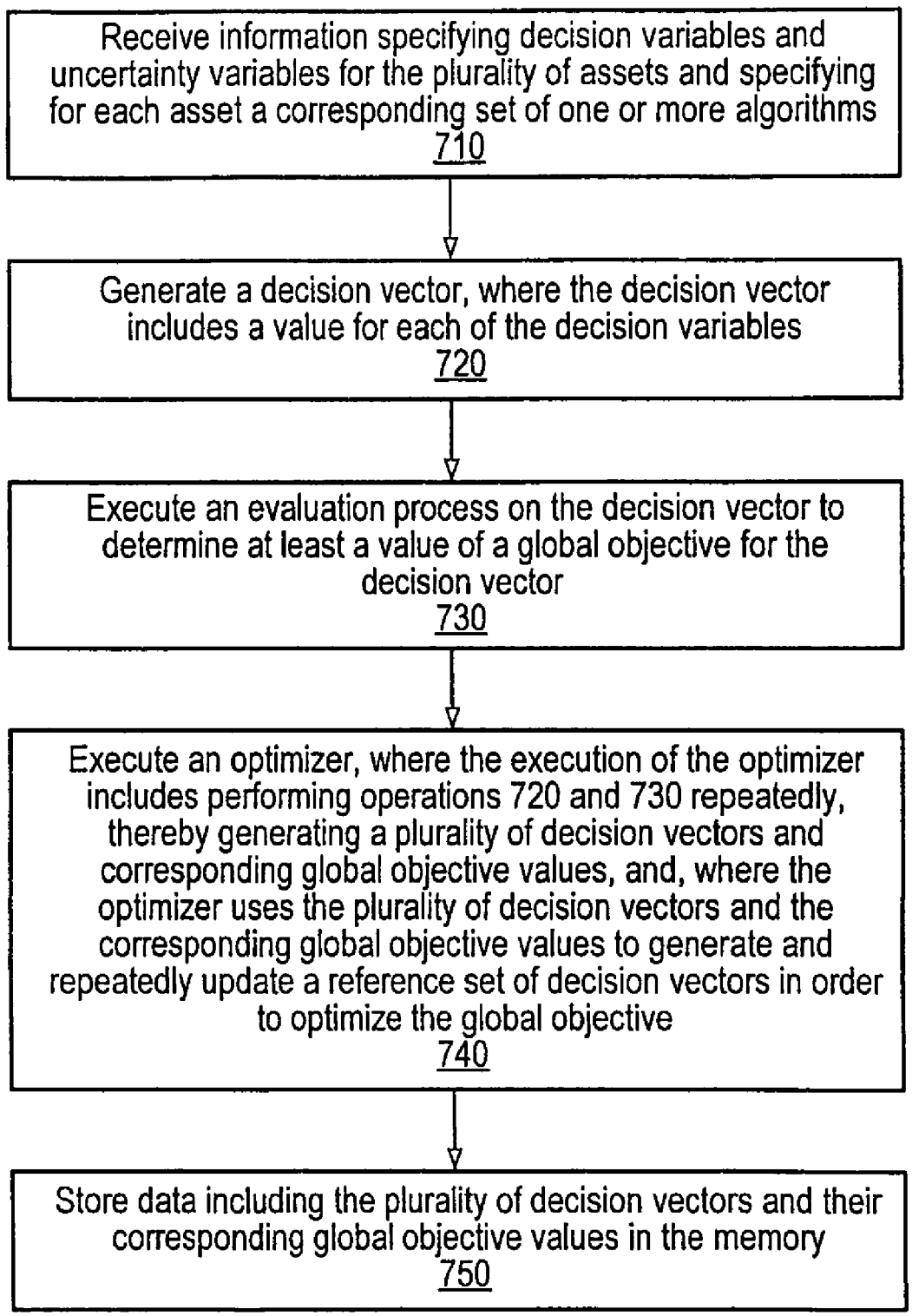
FIG. 7 illustrates another set of embodiments of the method for optimizing decisions.

In another set of embodiments, a method for optimizing decisions regarding a plurality of assets by means of executing program code on a first computer (e.g., a server computer) may involve the following operations as illustrated in FIG. 7.

In operation 710, a first computer (e.g., a server computer including one or more processors) may receive information specifying decision variables and uncertainty variables for the plurality of assets and specifying for each asset a corresponding set of one or more algorithms.

In operation 720, first computer may generate a decision vector, where the decision vector includes a value for each of the decision variables.

In operation 730, the first computer may execute an evaluation process on the decision vector to determine at least a value of a global objective for the decision vector.

In operation 740, the first computer may execute an optimizer, where said executing the optimizer includes performing operations 720 and 730 repeatedly, thereby generating a plurality of decision vectors and corresponding global objective values, and, where the optimizer uses the plurality of decision vectors and the corresponding global objective values to generate and repeatedly update a reference set of decision vectors in order to optimize the global objective.

In operation 750, the first computer may store data including the plurality of decision vectors and their corresponding global objective values in the memory.

Figure 8:
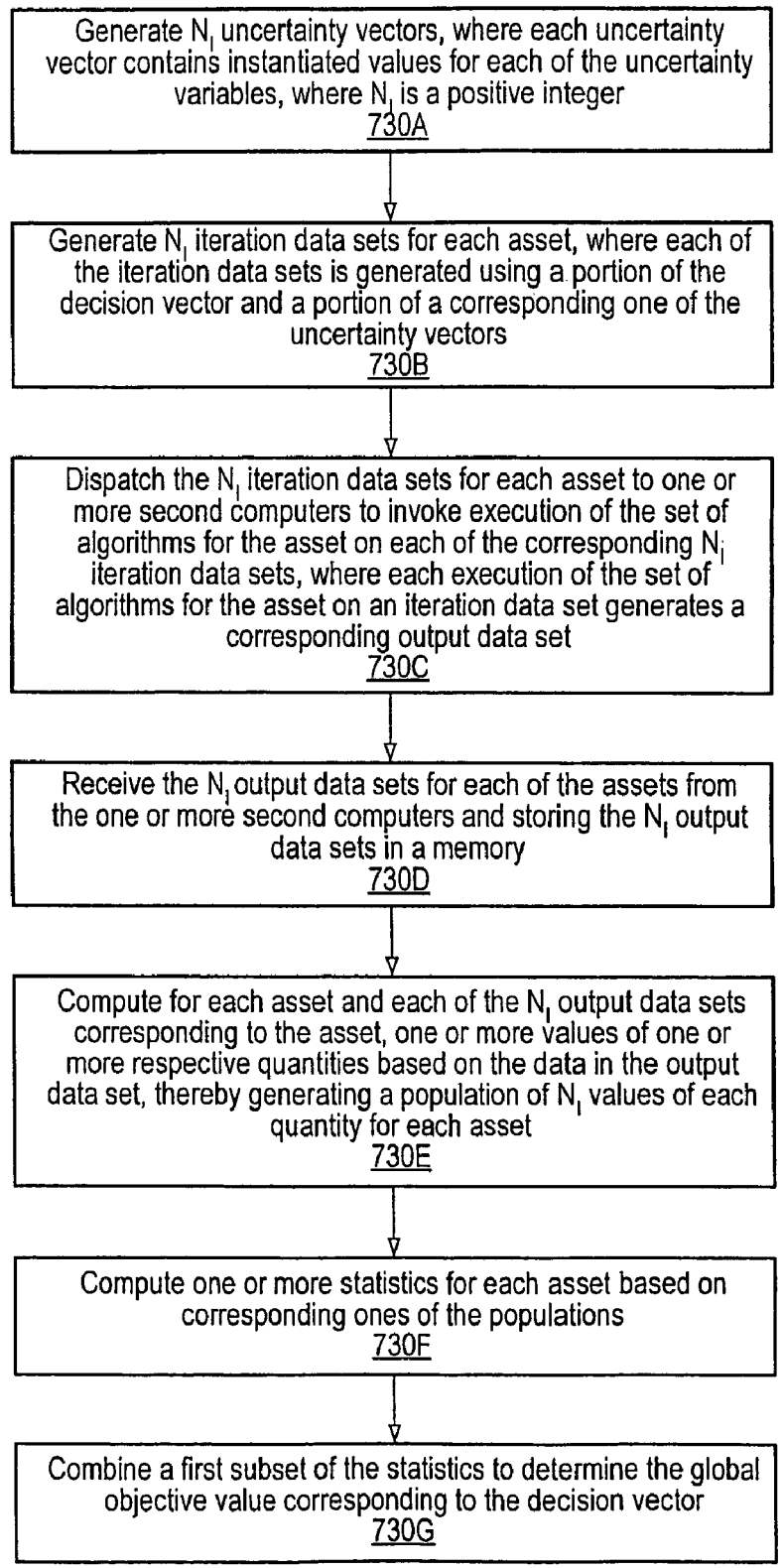
FIG. 8 illustrates one set of embodiments of operation 730 (i.e., the operation of executing the evaluation process) of FIG. 7, highlighting the act of dispatching iterations data sets to other computer(s) for execution on the other computer(s).

The operation 730 of executing the evaluation process may include the following operations as illustrated in FIG. 8.

In operation 730A, the first computer may generate $N_I$ uncertainty vectors, where each uncertainty vector contains instantiated values for each of the uncertainty variables, where $N_I$ is a positive integer.

In operation 730B, the first computer may generate $N_I$ iteration data sets for each asset, where each of the iteration data sets is generated using a portion of the decision vector and a portion of a corresponding one of the uncertainty vectors.

In operation 730C, the first computer may dispatch the $N_I$ iteration data sets for each asset to one or more second computers to invoke execution of the set of algorithms for the asset on each of the corresponding $N_I$ iteration data sets, where each execution of the set of algorithms for the asset on an iteration data set generates a corresponding output data set.

In operation 730D, the first computer may receive the $N_I$ output data sets for each of the assets from the one or more second computers and store the $N_I$ output data sets in a memory.

In operation 730E, the first computer may compute for each asset and each of the $N_I$ output data sets corresponding to the asset, one or more values of one or more respective quantities based on the data in the output data set, thereby generating a population of $N_I$ values of each quantity for each asset.

In operation 730F, the first computer may compute one or more statistics for each asset based on corresponding ones of the populations.

In operation 730G, the first computer may combine a first subset of the statistics to determine the global objective value corresponding to the decision vector.

The first computer and the one or more second computers may be coupled through a computer network, e.g., a local area network, an intranet, a wide area network, the Internet, etc.

The operation of dispatching the iteration data sets induces distributed execution of the sets of algorithms on the iterations data sets on a plurality of the second computers. The second computers may be organized into a grid structure.

In one embodiment, a subset of the iteration data sets may be executed locally by the first computer, depending in part on how much processing bandwidth is available on the first computer.

The information may be collected from a user by a process executing on a client computer and sent to the first computer by this process.

Figure 9:
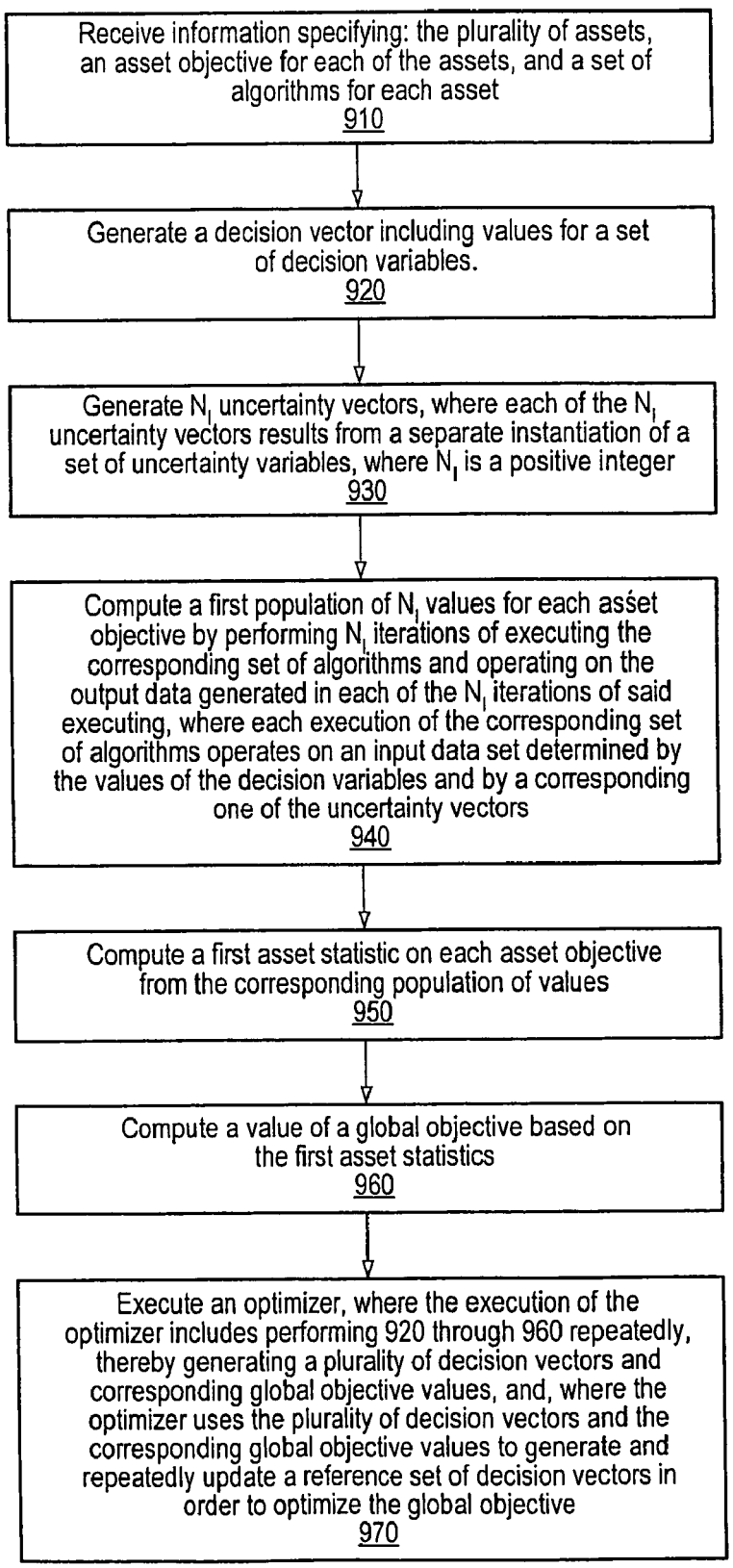
FIG. 9 illustrates yet another set of embodiments of the method for optimizing decisions.

In yet another set of embodiments, a method for optimizing decisions regarding a plurality of assets may involve the following operations as illustrated in FIG. 9.

In operation 910, a computer (e.g., a server computing including one or more processors) may receive information specifying the plurality of assets, an asset objective for each of the assets, and a set of algorithms for each asset.

In operation 920, the computer may generate a decision vector including values for a set of decision variables.

In operation 930, the computer may generate $N_I$ uncertainty vectors, where each of the $N_I$ uncertainty vectors results from a separate instantiation of a set of uncertainty variables, where $N_I$ is a positive integer.

In operation 940, the computer may compute a first population of $N_I$ values for each asset objective by performing $N_I$ iterations of executing the corresponding set of algorithms and operating on the output data generated in each of the $N_I$ iterations of said executing, where each execution of the corresponding set of algorithms operates on an input data set determined by the values of the decision variables and by a corresponding one of the uncertainty vectors.

In operation 950, the computer may compute a first asset statistic on each asset objective from the corresponding population of values.

In operation 960, the computer may compute a value of a global objective based on the first asset statistics.

In operation 970, the computer may execute an optimizer, where the execution of the optimizer includes performing 920 through 960 repeatedly, thereby generating a plurality of decision vectors and corresponding global objective values, and, where the optimizer uses the plurality of decision vectors and the corresponding global objective values to generate and repeatedly update a reference set of decision vectors in order to optimize the global objective.

In some embodiments, the computer may:

compute a second asset statistic for each asset from a corresponding one of the populations; and compute a value of an auxiliary function based on the second asset statistics.

The execution of the optimizer may attempt to optimize (i.e., maximize or minimize) the global objective subject to a constraint on one or more of the auxiliary function and the global objective.

Figure 10:
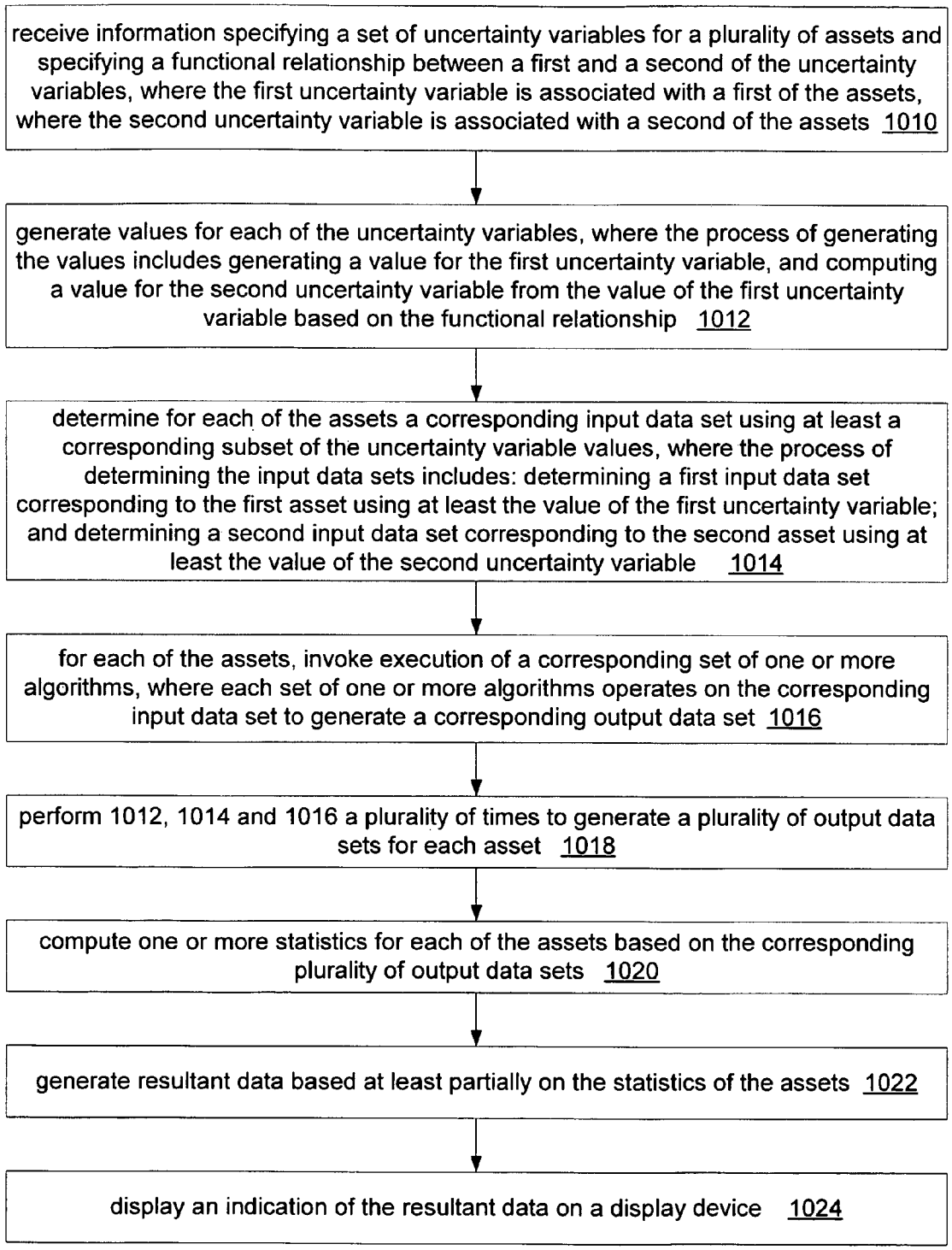
FIG. 10 illustrates one set of embodiments of a method for analyzing a plurality of assets in an integrated fashion in view of uncertainties associated with the assets.

In one set of embodiments, a method for analyzing the impact of uncertainties associated with a set of assets may involve the following actions, as illustrated in FIG. 10. The method may be implemented by a computer (e.g., a computer including one or more processors) or a set of computers.

At 1010, the computer may receive information specifying a set of uncertainty variables for a plurality of assets and specifying a functional relationship between a first and a second of the uncertainty variables. The first uncertainty variable may be associated with a first of the assets. The second uncertainty variable may be associated with a second of the assets. The information may be supplied by a user through a graphical user interface, e.g., an interface of the decision management system or decision flow builder as described above.

At 1012, the computer may generate values for each of the uncertainty variables. Any of various modes of instantiation may be used to generate the uncertainty variable values, as described variously herein. The instantiation mode may be selected by the user.

The process of generating the values for the uncertainty variables may include generating a value for the first uncertainty variable, and computing a value for the second uncertainty variable from the value of the first uncertainty variable based on the functional relationship. Thus, the first uncertainty variable is said to be dependent on the second uncertainty variable. Any number of such dependencies between uncertainty variables may be established, e.g., as described various embodiments above. Dependencies within assets as well as across asset may be established.

At 1014, the computer may determine for each of the assets a corresponding input data set using at least a corresponding subset of the uncertainty variable values. The process of determining the input data sets may include:
  determining a first input data set corresponding to the first asset using at least the value of the first uncertainty variable; and
  determining a second input data set corresponding to the second asset using at least the value of the second uncertainty variable.

Various examples of determining input data sets using uncertainty variable values are given in various embodiments above. For example, an uncertainty variable value may be substituted into an input data set, or, may be used to control the selection of a data structure which is to be substituted into an input data set.

At 1016, for each of the assets, the computer may invoke execution of a corresponding set of one or more algorithms. Each set of one or more algorithms may operate on the corresponding input data set to generate a corresponding output data set.

At 1018, the computer may perform 1012, 1014 and 1016 a plurality of times to generate a plurality of output data sets for each asset. The output data sets may be stored on a memory medium, e.g., for later viewing and/or analysis. In one embodiment, the memory medium may be a hard disk.

At 1020, the computer may compute one or more statistics for each of the assets based on the corresponding plurality of output data sets. The statistics may be specified by a user. See the various examples of statistics given in various embodiments described above, e.g., the embodiments described in connection with FIGS. 4, 6, 8 and 9. The statistics may also be stored on the memory medium.

At 1022, the computer may generate resultant data based at least partially on the statistics of the assets. For example, the resultant data may include a functional combination of the statistics of the plurality of assets, e.g., a user-specified functional combination.

At 1024, the computer may display an indication of the resultant data on a display device.

In some embodiments, the assets may be assets related to the exploration and production of one or more of oil and gas. For example, the assets may include a set of oil and gas fields.

The set of one or more algorithms for each asset may be selected by a user. The algorithms may be selected from a wide variety of supported algorithms. See the various examples of algorithms described above.

In one embodiment, the process 1016 of invoking execution may include:
  distributing the input data sets of the assets to one or more remote computers for remote execution of the corresponding sets of algorithms; and
  receiving the output data sets from the one or more remote computers.

See the examples described above, especially the examples of the dispatcher described above.

The information received at 1010 may also specify one or more correlations among the uncertainty variables. In this case, the process 1012 of generating values for each of the uncertainty variables respects the one or more specified correlations. The correlations may include correlations between uncertainty variables within assets or across different assets. Correlations among three or more uncertainty variables are also contemplated, as described above.

In some embodiments, the process 1014 of determining input data sets for the assets may include selecting one of two or more models for incorporation into one of the input data sets based on the value of a third of the uncertainty variables. Recall from discussion above that models may be subordinated to uncertainty variables. The uncertainty variables control the selection of one of the subordinated models.

In one embodiment, the process 1014 may include:
  selecting one of two or more models based on the value of a third of the uncertainty variables; and
  selecting one of two or more submodels of the selected model based on the value of a fourth of the uncertainty variables.

The selected submodel is usable to determine data to be incorporated into one (or more) of the input data sets.

More generally, a model may represent a hierarchical tree of models having associated uncertainty variables. The user may configure such hierarchical models with any desired number of levels. A data structure may be composed by:
  traversing the tree from top to bottom based on the values of one or more of the uncertainty variables, and
  appending the data included in each node along the traversed path.

Figure 11:
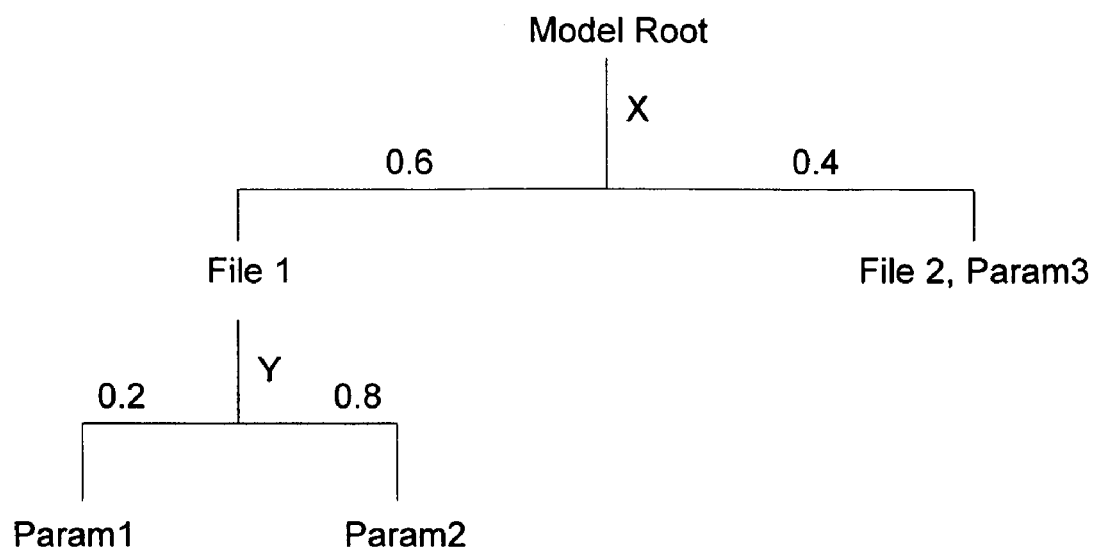
FIG. 11 illustrates an example of a hierarchical model having two levels of choice.

At each stage of the traversal, a corresponding uncertainty variable value controls which child node is to be selected. For example, FIG. 11 illustrates a hierarchical model having two levels of choice. An uncertainty variable X controls a first selection of File1 or {File2,Param3} with probabilities 0.6 and 0.4 respectively. A second uncertainty variable Y controls a second selection of Param1 or Param2 with probabilities 0.2 and 0.8 respectively. File1 and File2 represent data files, and Param1, Param2 and Param3 represent parameter values.

In some embodiments, the method may further involve:
(1) receiving information specifying a plurality of decision variables;
(2) generating values for the decision variables, where the decision variable values are used to determine the input data sets for the assets;
(3) computing a value of a global objective from the one or more statistics of each of the assets; and
executing an optimizer in order to determine one or more sets of values for the decision variables.

The process of executing an optimizer may include performing at least operations (2), 1018, 1020, and (3) a number of times, where the optimizer is configured to search for a maximum or minimum of the global objective over at least a portion of a space defined by the decision variables. For examples of (1), (2), (3) and said execution of the optimizer, please refer to the method embodiments described above in connection with FIGS. 2-9.

The optimizer may be selectable by a user from a set of supported optimizers.

The process 1024 of displaying an indication of the resultant data may include displaying a graphical representation of at least a subset of the one or more sets of values for the decision variables. The graphical representation may include a graph, a chart, a table, a listing, an image annotated with symbolic markers, etc.

The information received in (1) may also specify one or more constraints on the decision variables. In this case, the generation of values for the decision variables respects the one or more constraints. The constraints may be specified by a user, e.g., a described variously above. The constraints may include linear and/or nonlinear constraints.

The information received in (1) may also specify one or more functional dependencies between the decision variables. In this case, the generation of values for the decision variables respects the one or more functional dependencies between the decision variables. The functional dependencies may be specified by a user, e.g., as describe variously above.

Each of the decision variables has an associated set of attainable values representing possible outcomes of a corresponding decision. Furthermore, each of the uncertainty variables has an associated set of attainable values. Attainable value sets may be finite sets or sets having infinite cardinality.

In one embodiment, the method may further include:
(4) computing a value of an auxiliary function from the one or more statistics of each of the assets.

In this case, the process of executing the optimizer may include performing (2), 1018, 1020, (3) and (4) a number of times. The optimizer may be configured to search for the maximum or minimum of the global objective subject at least to a constraint on a functional combination of the global objective and the auxiliary function. The functional combination may be user specified. See examples of the auxiliary function and functional combination given in various embodiments above.

The process 1024 of displaying an indication of the resultant data on a display device may include displaying a plot of the global objective value versus auxiliary function value.

Figure 12A:
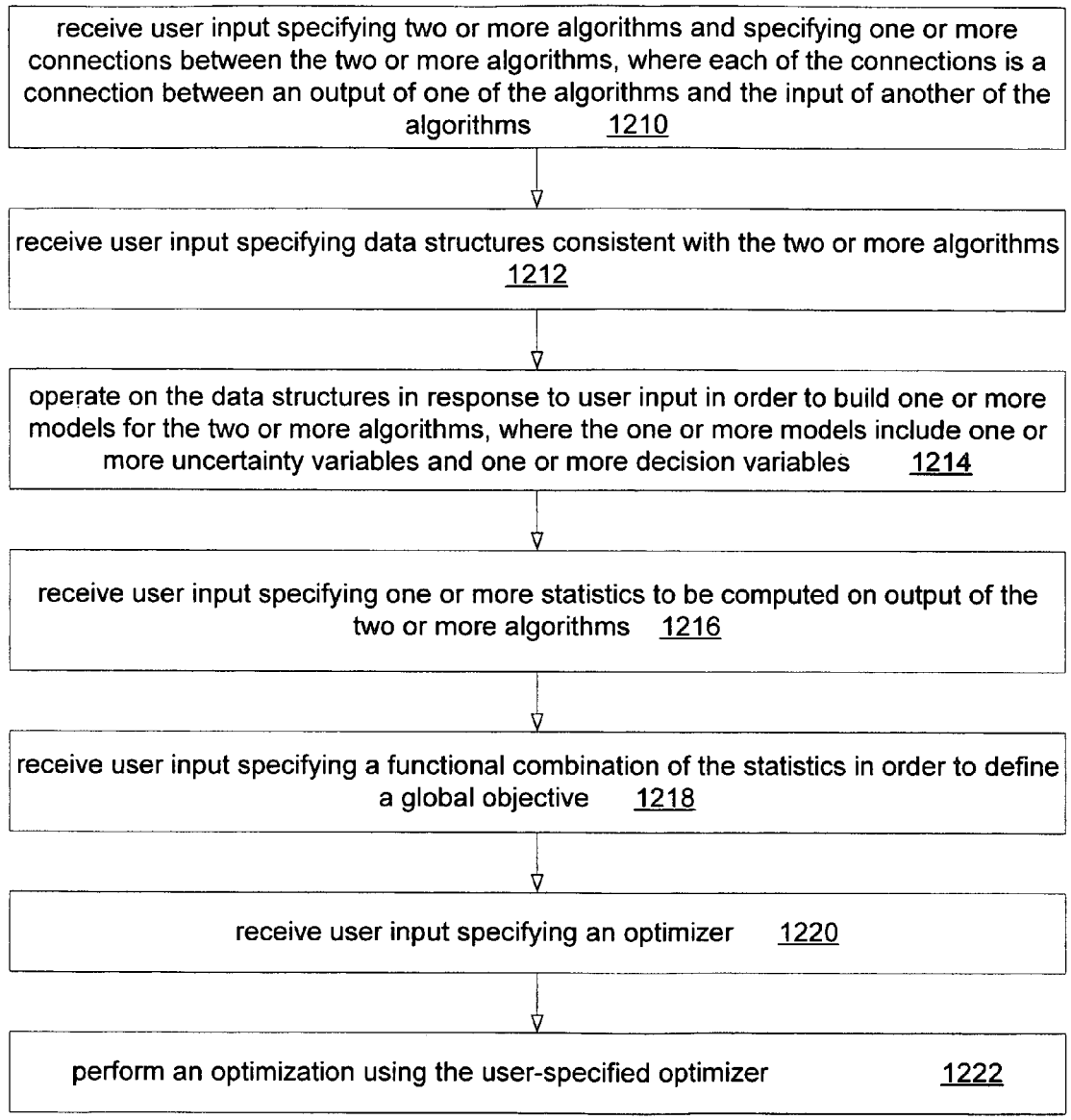
FIG. 12A illustrates one set of embodiments of a method for optimizing decisions regarding the exploration, development or production of assets such as oil and/or gas fields.

In another set of embodiments, a method for optimizing decisions related to oil and gas field exploration, development and production may involve the following actions, as illustrated in FIG. 12A.

At 1210, user input specifying two or more algorithms and specifying one or more connections between the two or more algorithms may be received. Each of the connections is a connection between an output of one of the algorithms and the input of another of the algorithms. The user may employ a graphical user interface (e.g., a graphical user interface of the flow builder or of the decision flow builder as described variously above).

At 1212, user input specifying one or more data structures consistent with the two or more algorithms may be received. See various examples given above.

At 1214, the one or more data structures may be operated on in response to user input in order to build one or more models for the two or more algorithms. The one or more models may include one or more uncertainty variables and one or more decision variables. The process of building models from data structures may include promoting data values in data structures to uncertainty variables and subordinating two or more data structures to an uncertainty variable, as described above.

At 1216, user input specifying one or more statistics to be computed on output of the two or more algorithms may be received. See the various examples of statistics given above.

At 1218, user input specifying a functional combination of the statistics in order to define a global objective may be received. Any of various functional combinations are contemplated, including linear and nonlinear combinations.

At 1220, user input specifying an optimizer may be received. The optimizer may be selected from a supported set of optimizers. In one embodiment, program code for an optimizer may be readily added by the user to the supported set.

At 1222, an optimization may be performed using the user-specified optimizer in order to seek an optimum of the global objective. For example, the optimization may be performed as described above in connection with FIGS. 2-9.

In one set of embodiments, processes 1216 and 1218 may be omitted.

In some embodiments, the method may further involve displaying a graphical representation of progress of the optimization, as described variously above. For example, the method may involve one or more of:
displaying a graph of objective function versus outer iteration index (i.e., the index of the optimization loop);
displaying a graph of objective function value versus auxiliary function value including points representing the iterations of the outer loop (i.e., the optimization loop);
displaying a graph of objective function versus a functional combination of the objective function and the auxiliary function, the graph including points representing the iterations of the outer loop;
displaying a graph of an optimal value locus as described above; and
displaying a graphical representation of the decision variable values generated in the optimization.

Figure 12B:
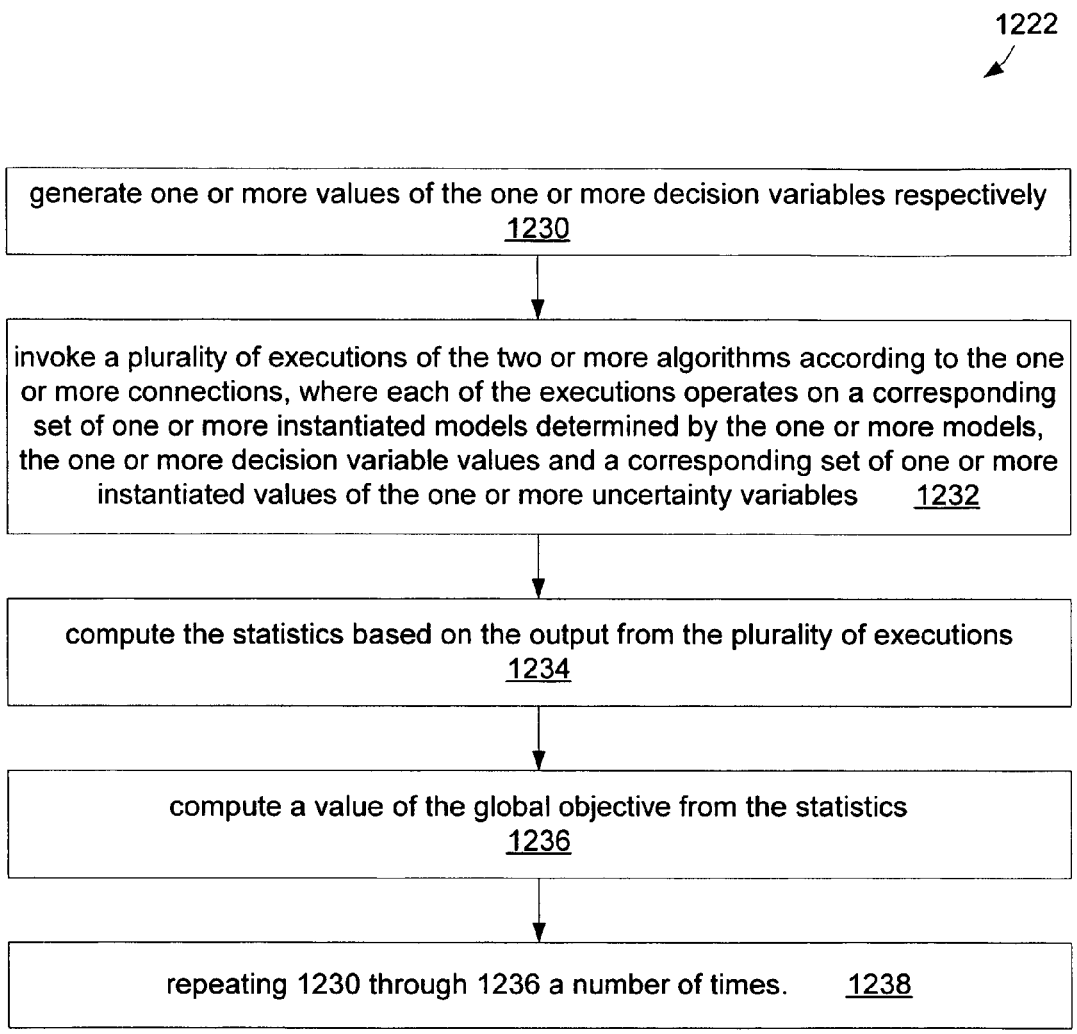
FIG. 12B illustrates one set of embodiments of a method for performing an optimization.

The process of performing the optimization may include the following actions, as illustrated in FIG. 12B.

At 1230, one or more values of the one or more decision variables respectively may be generated. For example, see the discussion above of generating decision vectors from the set of decision variables.

At 1232, a plurality of executions of the two or more algorithms according to the one or more connections may be invoked. Each of the executions may operate on a corresponding set of one or more instantiated models determined by the one or more models, the one or more decision variable values and a corresponding set of one or more instantiated values of the one or more uncertainty variables. For examples of invoking the plurality of executions, please refer to the description above connected with actions 410 through 445A of FIG. 4, the description above connected with actions 520A through 520E of FIG. 6, the description above connected with actions 730A through 730E of FIG. 8, and the description above connected with actions 930 and 940 of FIG. 9.

At 1234, the statistics may be computed based on the output from the plurality of executions.

At 1236, a value of the global objective may be computed from the statistics according to the user-specified functional combination.

At 1238, the processes 1230 through 1238 may be repeated a number of times, e.g., until a termination condition is satisfied. See various examples of termination conditions given above.

In some embodiments, the processes 1210 through 1220 may be performed on a client computer and process 1222 may be performed on a server computer. Thus, the method may also involve sending information specifying the two or more algorithms, information specifying the one or more connections, information specifying the one or more statistics, information specifying the optimizer and information specifying the global objective to the server computer.

In some embodiments, the server computer may perform process 1222 by:
(1) generating a set of one or more instantiated values of the one or more uncertainty variables;
(2) determining one or more instantiated models from the one or more models and the set of one or more instantiated values;
(3) sending the one or more instantiated models to a remote computer, where the remote computer performs one of the plurality of executions of the two or more algorithms on the one or more instantiated models; and
repeating (1) through (3) in order to distribute the plurality of executions to a set of one or more remote computers.

In one embodiment, the method may further involve receiving user input specifying a mode of instantiation, as described above. The mode of instantiation controls how the instantiated values are generated from the uncertainty variables.

In one embodiment, the method may further involve receiving user input specifying a dispatcher. The dispatcher is a program that controls the process of invoking the plurality of executions of the two or more algorithms on the set of remote computers. The server may execute the dispatcher to implement said repeating of (1) through (3). In one embodiment, program code for new dispatchers may be incorporated by the user into the decision management system.

Furthermore, the method may involve:
receiving user input specifying one or more auxiliary functions, each auxiliary function being a corresponding functional combination of a corresponding subset of the statistics; and
receiving user input specifying one or more constraints on the one or more auxiliary functions and the global objective;

The process of performing the optimization respects the one or more constraints on the one or more auxiliary functions and the global objective.

The one or more algorithms may include algorithms that simulate processes associated with the exploration, development or production of oil or gas. For example, the one or more algorithms may include algorithms that simulate processes associated with one or more fields such as exploration fields, development fields and production fields.

In one embodiment, the method may further involve receiving user input specifying functional dependencies between the uncertainty variables, e.g., as described above. The process of generating instantiated values for the uncertainty variables respects the functional dependencies between the uncertainty variables.

In one embodiment, the method may further involve receiving user input specifying functional dependencies between the decision variables, e.g., as described above. The process of generating the decision variable values respects the functional dependencies between the decision variables.

In one embodiment, the user may specify correlations between the uncertainty variables, e.g., as described above. The process of generating instantiated values of the uncertainty variables respects the user-specified correlations.

In one embodiment, user input specifying calculations to be performed intermediately between the output of one or more algorithms and the input of another algorithm may be received. (This user input may be part of the user input received in 1210.) Program code representing the calculations may be embedded in a calculator algorithm. See the discussion above regarding the results calculator and the results calculator interface. The two or more algorithms of 1210 may include one or more such calculator algorithms.

Figure 13:
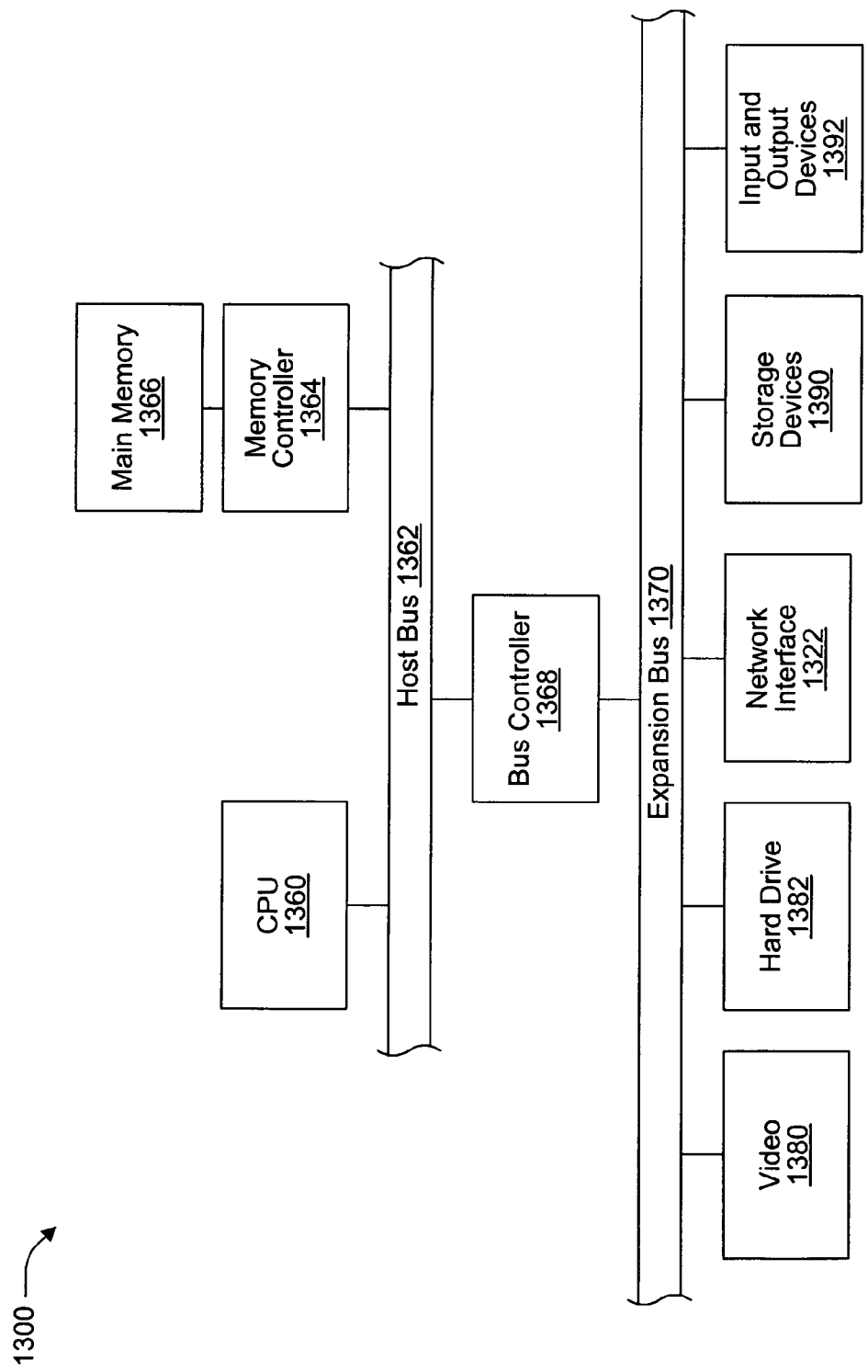
FIG. 13 illustrates one set of embodiments of a computer system that may take the role of the server computer in some embodiments and of the client computer in some embodiments.

FIG. 13—Computer System Block Diagram

FIG. 13 is a block diagram representing one set of embodiments of a computer system 1300 that may take the role of the server computer or the client computer as variously described herein or the computer discussed above in connection with FIG. 10.

The computer system 1300 may include at least one central processing unit CPU 1360 (i.e., processor) which is coupled to a host bus 1362. The CPU 1360 may be any of various types, including, but not limited to, an x86 processor, a PowerPC processor, a CPU from the SPARC family of RISC processors, as well as others. A memory medium, typically including semiconductor RAM, and referred to herein as main memory 1366, may be coupled to the host bus 1362 by means of memory controller 1364. The main memory 1366 may store programs executable to implement any or all or any subset of the various method embodiments described herein. The main memory may also store operating system software, as well as other software for operation of the computer system.

The host bus 1362 may couple to an expansion or input/output bus 1370 through a bus controller 1368 or bus bridge logic. The expansion bus 1370 may include slots for various devices such as a video card 1380, a hard drive 1382, storage devices 1390 (such as a CD-ROM drive, a tape drive, a floppy drive, etc.) and a network interface 1322. The video card 1380 may couple to a display device such as a monitor, a projector, or a head mounted display. The network interface 1322 (e.g., an Ethernet device) may be used to communicate with other computers through a network.

The computer system 1300 may also include I/O devices 1392 such as a mouse, keyboard, speakers.

Embodiments of computer system 1300 targeted for use as a server computer may be more richly endowed with processor capacity (e.g., having multiple processors), memory capacity and network access bandwidth than embodiments targeted for use as a client computer. The client computer may include the mouse, keyboard, speakers and video card (or graphics accelerator), whereas a server computer does not necessarily include these items. Any method embodiment (or portion thereof) described herein may be implemented in terms of program instructions. The program instructions may be stored on any of various kinds of computer readable memory media. The program instructions are readable and executable (by a computer or set of computers) to implement the method embodiment (or portion thereof).

Terminology

The following terminology is used herein.

| | |
|---|---|
| Algorithm: | An algorithm is a computational method. |
| Argument: | The inputs and outputs of an algorithm are referred to as arguments. An argument can either be an input to an algorithm, an output from an algorithm, or, both an input and an output. Each argument may have a unique name (relative to the algorithm for which it is defined) and also a specific type of object it can transport (e.g., a float, an integer, a string, etc.). |
| Argument Map: | The collection of arguments belonging to an algorithm is referred to as its argument map. |
| Loop: | A loop is used to perform an algorithm a number of times (however not necessarily sequentially as has been noted above). A loop may be constructed of an algorithm iterator, an algorithm and an optional dispatcher (i.e., a mechanism for distributing iterations of the algorithm). The flow builder may give the user a choice of different algorithm iterators to use in a loop, and, a choice of different dispatchers to use in the loop. A loop itself is an algorithm. The argument map of a loop may be defined as a combination of the argument map of the algorithm iterator and the argument map of the algorithm. |
| Memory Medium - | A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc. |
| Algorithm Iterator: | An algorithm iterator is used to produce iteration data sets for the associated algorithm within a loop. The algorithm iterator may have a pair of argument maps. One argument map is exposed through the loop to the outside and is used as the inputs and outputs of the algorithm iterator. The second argument map is used for communicating with the associated algorithm within the loop. |
| Dispatcher: | A dispatcher is used to distribute iterations of the associated algorithm. |
| Script Algorithm: | A script algorithm is a script (such as a Jython script or Perl script) embedded inside an algorithm. The input arguments of the algorithm may be supplied to the script, and the output arguments of the script may be the output arguments of the algorithm. |
| Process Algorithm: | A process algorithm is an external process that is embedded into an algorithm. Process algorithms may include process simulation algorithms and optimization algorithms. A process simulation algorithm performs a simulation of a physical system, typically, based on one or more models supplied as input. One example of a process simulation algorithm is a simulator of fluid flow through porous media, referred to as a reservoir simulator. |
| Flow: | A flow is an interconnected set of algorithms. To connect an output argument of one algorithm to an input argument of a second algorithm, the flow builder may require a matching of argument name and type. For example, an INT output may be passed to a FLOAT input. However, passing a STRING output to an INT input may be forbidden. A graphical user interface may be supplied to allow arguments of different algorithms to be connected manually. Once created, a flow may be converted to an algorithm, if desired. |

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    (a) a computer system receiving first information specifying a set of uncertainty variables that characterize uncertainties associated with a plurality of assets, wherein the first information also specifies a functional relationship between a first and a second of the uncertainty variables, wherein the first uncertainty variable is associated with a first of the assets, wherein the second uncertainty variable is associated with a second of the assets, wherein the assets are assets related to the exploration and production of one or more of oil and gas, wherein the first asset is a first oil and/or gas field, wherein the second asset is a second oil and/or gas field, wherein the uncertainty variables include a volume of hydrocarbons associated with the first asset, and a producibility of hydrocarbons associated with the first asset, wherein the uncertainty variables also include the prices of oil and gas;
    (b) the computer system generating values for each of the uncertainty variables, wherein said generating includes generating a value for the first uncertainty variable, and computing a value for the second uncertainty variable from the value of the first uncertainty variable based on the functional relationship;
    (c) the computer system determining for each of the assets a corresponding input data set using at least a corresponding subset of the uncertainty variable values, wherein said determining includes:

determining a first input data set corresponding to the first asset using at least the value of the first uncertainty variable; and determining a second input data set corresponding to the second asset using at least the value of the second uncertainty variable;

(d) for each of the assets, the computer system invoking execution of a corresponding set of one or more algorithms, wherein each set of one or more algorithms operates on the corresponding input data set to generate a corresponding output data set;

(e) the computer system performing (b), (c) and (d) a plurality of times to generate a respective plurality of output data sets for each asset;

(f) the computer system computing one or more statistics for each of the assets based on the corresponding plurality of output data sets;

(g) the computer system generating resultant data based at least partially on the statistics of the assets, wherein the resultant data includes a functional combination of the statistics of the plurality of assets;

(h) the computer system displaying an indication of the resultant data on a display device;

(i) the computer system receiving second information specifying a plurality of decision variables, wherein the decision variables include a number of wells to drill in the first asset;

(j) the computer system generating values for the decision variables, wherein the decision variable values are used to determine the input data sets for the assets;

(k) the computer system computing a value of a global objective from the one or more statistics of each of the assets; and the computer system executing an optimizer in order to determine one or more sets of values for the decision variables, wherein said executing the optimizer includes performing at least (j), (e), (f) and (k) a number of times, wherein the optimizer is configured to search for a maximum or minimum of the global objective over at least a portion of a space defined by the decision variables.

2. The method of claim 1, wherein the one or more algorithms corresponding to each of the assets are selected by a user.

3. The method of claim 1, wherein (d) includes:
the computer system distributing the input data sets of the assets to one or more remote computers for remote execution of the corresponding sets of algorithms; and
the computer system receiving the output data sets from the one or more remote computers.

4. The method of claim 1, wherein said first information also specifies one or more correlations among the uncertainty variables, wherein said generation of values for each of the uncertainty variables respects the one or more specified correlations.

5. The method of claim 4, wherein the uncertainty variables include a third uncertainty variable and a fourth uncertainty variable associated with different ones of the assets, wherein the one or more correlations include a correlation between the third and fourth uncertainty variables.

6. The method of claim 1, wherein (c) includes selecting one of two or more models for incorporation into one of the input data sets based on the value of a third of the uncertainty variables.

7. The method of claim 1, wherein (c) includes:
selecting one of two or more models based on the value of a third of the uncertainty variables;

selecting one of two or more submodels of the selected model based on the value of a fourth of the uncertainty variables;
wherein the selected submodel is usable to determine data to be incorporated into one of the input data sets.

8. The method of claim 1, wherein the optimizer is selected by a user from a set of supported optimizers.

9. The method of claim 1, wherein said displaying an indication of the resultant data includes displaying a graphical representation of at least a subset of the one or more sets of values for the decision variables.

10. The method of claim 1, wherein said second information also specifies one or more constraints on the decision variables, wherein said generation of values for the decision variables respects the one or more constraints.

11. The method of claim 1, wherein said second information also specifies one or more functional dependencies between the decision variables, wherein said generation of values for the decision variables respects said one or more functional dependencies between the decision variables.

12. The method of claim 1, wherein each of the decision variables has an associated set of attainable values representing possible outcomes of a corresponding decision, wherein each of the uncertainty variables has an associated set of attainable values.

13. The method of claim 1 further comprising:
(l) computing a value of an auxiliary function from the one or more statistics of each of the assets;
wherein said performing the optimization includes performing (j), (e), (f), (k) and (l) said number of times.

14. The method of claim 13, wherein the optimizer is configured to search for said maximum or minimum of the global objective subject at least to a constraint on a functional combination of the global objective and the auxiliary function.

15. The method of claim 13, wherein said displaying an indication of the resultant data on a display device includes:
displaying a plot of the global objective value versus auxiliary function value.

16. The method of claim 1, wherein the set of algorithms corresponding to at least one of the assets includes a reservoir flow simulator.

17. A computer-readable memory medium that stores program instructions, wherein the program instructions, if executed by a computer system, cause the computer system to perform a method comprising:
(a) receiving first information specifying a set of uncertainty variables that characterize uncertainties associated with a plurality of assets, wherein the first information also specifies a functional relationship between a first and a second of the uncertainty variables, wherein the first uncertainty variable is associated with a first of the assets, wherein the second uncertainty variable is associated with a second of the assets, wherein the assets are assets related to the exploration and production of one or more of oil and gas, wherein the first asset is a first oil and/or gas field, wherein the second asset is a second oil and/or gas field, wherein the uncertainty variables include a volume of hydrocarbons associated with the first asset, and a producibility of hydrocarbons associated with the first asset, wherein the uncertainty variables also include the prices of oil and gas;

(b) generating values for each of the uncertainty variables, wherein said generating includes generating a value for the first uncertainty variable, and computing a value for the second uncertainty variable from the value of the first uncertainty variable based on the functional relationship;
(c) determining for each of the assets a corresponding input data set using at least a corresponding subset of the uncertainty variable values, wherein said determining includes:
  determining a first input data set corresponding to the first asset using at least the value of the first uncertainty variable; and
  determining a second input data set corresponding to the second asset using at least the value of the second uncertainty variable;
(d) for each of the assets, invoking execution of a corresponding set of one or more algorithms, wherein each set of one or more algorithms operates on the corresponding input data set to generate a corresponding output data set;
(e) performing (b), (c) and (d) a plurality of times to generate a respective plurality of output data sets for each asset;
(f) computing one or more statistics for each of the assets based on the corresponding plurality of output data sets;
(g) generating resultant data based at least partially on the statistics of the assets, wherein the resultant data comprises a functional combination of the statistics of the plurality of assets;
(h) displaying an indication of the resultant data on a display device;
(i) receiving second information specifying a plurality of decision variables, wherein the decision variables include a number of wells to drill in the first asset;
(j) generating values for the decision variables, wherein the decision variable values are used to determine the input data sets for the assets;
(k) computing a value of a global objective from the one or more statistics of each of the assets; and
executing an optimizer in order to determine one or more sets of values for the decision variables, wherein said executing the optimizer includes performing at least (j), (e), (f) and (k) a number of times, wherein the optimizer is configured to search for a maximum or minimum of the global objective over at least a portion of a space defined by the decision variables.

18. The memory medium of claim 17, wherein the method further comprises:
displaying a graphical representation of progress of the optimization.

19. A computer system comprising:
a memory configured to store program instructions;
at least one processor configured to read and execute the program instructions, wherein, said program instructions are executable to implement:
(a) receiving first information specifying a set of uncertainty variables that characterize uncertainties associated with a plurality of assets, wherein the first information also specifies a functional relationship between a first and a second of the uncertainty variables, wherein the first uncertainty variable is associated with a first of the assets, wherein the second uncertainty variable is associated with a second of the assets, wherein the assets are assets related to the exploration and production of one or more of oil and gas, wherein the first asset is a first oil and/or gas field, wherein the second asset is a second oil and/or gas field, wherein the uncertainty variables include a volume of hydrocarbons associated with the first asset, and a producibility of hydrocarbons associated with the first asset, wherein the uncertainty variables also include the prices of oil and gas;
(b) generating values for each of the uncertainty variables, wherein said generating includes generating a value for the first uncertainty variable, and computing a value for the second uncertainty variable from the value of the first uncertainty variable based on the functional relationship;
(c) determining for each of the assets a corresponding input data set using at least a corresponding subset of the uncertainty variable values, wherein said determining includes:
  determining a first input data set corresponding to the first asset using at least the value of the first uncertainty variable; and
  determining a second input data set corresponding to the second asset using at least the value of the second uncertainty variable;
(d) for each of the assets, invoking execution of a corresponding set of one or more algorithms, wherein each set of one or more algorithms operates on the corresponding input data set to generate a corresponding output data set;
(e) performing (b), (c) and (d) a plurality of times to generate a respective plurality of output data sets for each asset;
(f) computing one or more statistics for each of the assets based on the corresponding plurality of output data sets;
(g) generating resultant data based at least partially on the statistics of the assets, wherein the resultant data comprises a functional combination of the statistics of the plurality of assets;
(h) displaying an indication of the resultant data on a display device;
(i) receiving second information specifying a plurality of decision variables, wherein the decision variables include a number of wells to drill in the first asset;
(j) generating values for the decision variables, wherein the decision variable values are used to determine the input data sets for the assets;
(k) computing a value of a global objective from the one or more statistics of each of the assets; and
executing an optimizer in order to determine one or more sets of values for the decision variables, wherein said executing the optimizer includes performing at least (j), (e), (f) and (k) a number of times, wherein the optimizer is configured to search for a maximum or minimum of the global objective over at least a portion of a space defined by the decision variables.

20. The computer system of claim 19, wherein (d) includes:
distributing the input data sets of the assets to one or more remote computers for remote execution of the corresponding sets of algorithms; and
receiving the output data sets from the one or more remote computers.

* * * * *